United States Patent
Nakayasu et al.

(10) Patent No.: US 10,523,579 B2
(45) Date of Patent: Dec. 31, 2019

(54) RELAY DEVICE AND DATA TRANSFER METHOD

(71) Applicant: Mitsubishi Electric Corporation, Tokyo (JP)

(72) Inventors: Toshiyuki Nakayasu, Tokyo (JP); Sachiko Taniguchi, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 73 days.

(21) Appl. No.: 15/304,576

(22) PCT Filed: Mar. 30, 2015

(86) PCT No.: PCT/JP2015/059932
§ 371 (c)(1),
(2) Date: Oct. 17, 2016

(87) PCT Pub. No.: WO2015/163094
PCT Pub. Date: Oct. 29, 2015

(65) Prior Publication Data
US 2017/0041243 A1 Feb. 9, 2017

(30) Foreign Application Priority Data

Apr. 23, 2014 (JP) .................. PCT/JP2014/061469

(51) Int. Cl.
*H04L 12/865* (2013.01)
*H04L 12/875* (2013.01)
(Continued)

(52) U.S. Cl.
CPC ...... *H04L 47/6275* (2013.01); *H04L 12/4625* (2013.01); *H04L 47/2433* (2013.01); *H04L 47/56* (2013.01)

(58) Field of Classification Search
None
See application file for complete search history.

(56) References Cited

U.S. PATENT DOCUMENTS 5,343,473 A * 8/1994 Cidon ................. H04L 12/6418
370/465
5,557,608 A * 9/1996 Calvignac ............... H04L 29/06
370/389
(Continued)

FOREIGN PATENT DOCUMENTS

CN 101548494 A 9/2009
EP 0582537 A2 * 2/1994 ............. H04L 29/06
(Continued)

OTHER PUBLICATIONS

Communication dated Apr. 18, 2017, from the Japanese Patent Office in counterpart Japanese application No. 2016-514834.
(Continued)

*Primary Examiner* — George C Atkins
(74) *Attorney, Agent, or Firm* — Sughrue Mion, PLLC; Richard C. Turner

(57) ABSTRACT

The relay device includes: a frame determination unit that determines a received frame between a high-priority frame and a low-priority frame for each output port on a basis of an identifier; a fixed-delay queue that delays the high-priority frame for a time equal to or longer than the sum of a specified transmission gap and a frame length long enough for a downstream device to be capable of correctly receiving and transferring or discarding a frame, and that transmits the high-priority frame; a low-priority frame storing unit that stores therein the low-priority frame; a transmission-frame selection unit that executes control to discontinue transmission of the low-priority frame when transmitting the high-priority frame, and to retransmit the low-priority frame; and an output control unit that selects a frame to be transmitted to the downstream device on a basis of the control by the transmission-frame selection unit.

24 Claims, 16 Drawing Sheets

(51) Int. Cl.
*H04L 12/851* (2013.01)
*H04L 12/46* (2006.01)

(56) References Cited

U.S. PATENT DOCUMENTS

| | | | |
|---|---|---|---|
| 6,671,275 B1 | 12/2003 | Wong et al. | |
| 6,975,626 B1 | 12/2005 | Eberle et al. | |
| 2003/0156595 A1* | 8/2003 | Kishigami | H04L 12/66 370/445 |
| 2005/0129036 A1 | 6/2005 | Sawabe | |
| 2005/0175013 A1* | 8/2005 | Le Pennec | H04L 47/10 370/395.42 |
| 2006/0126511 A1* | 6/2006 | Youn | H04L 47/10 370/235 |
| 2008/0089364 A1* | 4/2008 | Barry | H04L 47/10 370/517 |
| 2011/0026538 A1 | 2/2011 | Takeuchi et al. | |
| 2011/0142052 A1* | 6/2011 | Kulkarmi | H04L 47/245 370/392 |
| 2012/0327950 A1 | 12/2012 | Gotz et al. | |
| 2013/0016609 A1* | 1/2013 | Hayakawa | H04L 69/14 370/230 |
| 2014/0098824 A1 | 4/2014 | Edmiston | |
| 2014/0341032 A1* | 11/2014 | Thaler | H04L 47/2433 370/235 |
| 2015/0117177 A1* | 4/2015 | Ganga | H04L 49/251 370/216 |

FOREIGN PATENT DOCUMENTS

| | | | |
|---|---|---|---|
| JP | 2002-217971 A | 8/2002 | |
| JP | 2004343449 A | 12/2004 | |
| JP | 2007-243382 A | 9/2007 | |
| JP | 4302014 B2 | 7/2009 | |
| JP | 2009-194773 A | 8/2009 | |
| JP | 4875423 B2 | 2/2012 | |
| JP | 5094532 B2 | 12/2012 | |
| JP | 2013-121144 A | 6/2013 | |
| JP | 5302559 B2 | 10/2013 | |
| WO | 2012/172389 A1 | 12/2012 | |
| WO | 2013/111285 A1 | 8/2013 | |

OTHER PUBLICATIONS

Communication dated Oct. 24, 2017 from the Japanese Patent Office in counterpart Japanese application No. 2016-514834.
Communication dated Nov. 9, 2016, from the Intellectual Property Office of Taiwan in counterpart application No. 104112535.
Constantinos Dovrolis, et al., "A Case for Relative Differentiated Services and the Proportional Differentiation Model", IEEE Network, Sep./Oct. 1999, pp. 26-34.
International Search Report for PCT/JP2015/059932 dated May 19, 2015 [PCT/ISA/210].
Written Opinion for PCT/JP2015/059932 dated May 19, 2015 [PCT/ISA/237].
Communication dated Apr. 2, 2018 from the Korean Intellectual Property Office in counterpart application No. 10-2016-7029151, total of 8 pages with translation.
Communication dated Oct. 22, 2018, from Korean Intellectual Property Office in counterpart application No. 10-2016-7029151, 8 pages with translation.
Communication dated Dec. 3, 2018, issued by the State Intellectual Property Office of the P.R.C. in corresponding application No. 201580020840.7.
Office Action dated Jun. 18, 2019 by the State Intellectual Property Office of P.R.C. in corresponding CN Application No. 201580020840.7, 16 pages with translation.

* cited by examiner

RELAY DEVICE AND DATA TRANSFER METHOD

CROSS REFERENCE TO RELATED APPLICATIONS

This application is a National Stage of International Application No. PCT/JP2015/059932 filed Mar. 30, 2015, claiming priority based on Japanese Patent Application No. PCT/JP2014/061469 filed Apr. 23, 2014, the contents of all of which are incorporated herein by reference in their entirety.

FIELD

The present invention relates to a relay device and a data transfer method.

BACKGROUND

The use of the Ethernet® in the industrial field is currently growing. At manufacturing sites, factory-automation (FA) networks have been constructed, which are communication networks that connect FA devices, such as a programmable logic controller (PLC), an inverter, and a sensor. In an FA network, in order to execute high-speed and high-accuracy motion control, a relay device is required to transfer a frame, which is sensitive to delay fluctuations, with a fixed delay time. Examples of a fixed-delay frame required to be transferred with a fixed delay include a frame to be used for time synchronization between FA devices.

In a general relay device, a store-and-forward transfer control method is used, in which the entire frame is accumulated and then output. According to the store-and-forward transfer method, "Priority Queuing" described in Non Patent Literature 1 is used, in which transfer frames are categorized into classes and the priority is defined for each of the classes. By thus preferentially transferring a high-priority frame, it is possible to reduce a transfer delay time. However, even by using the "Priority Queuing" described above, the store-and-forward method still cannot eliminate delay jitter. This is because, in the store-and-forward method, when a high-priority frame is input during the transmission of a low-priority frame, the high-priority frame needs to wait until transmission of the low-priority frame is completed, thereby causing fluctuations in the transfer delay time for the high-priority frame.

As long as a transfer conflict occurs between a high-priority frame and a low-priority frame at an output port, there is a possibility for delay jitter, determined on the basis of a maximum frame length and a transfer speed of the low-priority frame, to be added to a transfer delay time for the high-priority frame. Therefore, in order to eliminate delay jitter of a high-priority frame, it is required to avoid a transfer conflict between a high-priority frame and a low-priority frame at the output port. In a demultiplexing device including a plurality of input ports, a transfer conflict between high-priority frames may occur. Therefore, the demultiplexing device is also required to avoid a transfer conflict between high-priority frames.

The aforementioned technique to reduce delay jitter of a high-priority frame when a transfer conflict occurs between a low-priority frame and a high-priority frame is disclosed in, for example, Patent Literature 1. In this technique, when a high-priority frame is input to a relay device during transmission of a low-priority frame, the relay device interrupts transmitting the high-priority frame by inserting the low-priority frame thereinto, so as to reduce delay jitter of the high-priority frame. The relay device adds a control code indicating an insertion position at the beginning and the end of the interrupting high-priority frame to be transmitted, and then it transmits this frame.

Further, Patent Literature 2 discloses a technique of a communication device, in which when a transfer conflict between a low-priority frame and a high-priority frame occurs, the communication device stops to transmit the low-priority frame and preferentially transmits the high-priority frame. The communication device stores the low-priority frame in a retransmission buffer concurrently with transmitting the high-priority frame. After transmitting the high-priority frame, the communication device retransmits the low-priority frame for which transmission has been stopped due to the transfer conflict.

Furthermore, Patent Literature 3 discloses a technique of transferring a high-priority frame more preferentially than a low-priority frame by operation of a time-slot control. A network device transfers a high-priority frame with a low delay repeatedly at a predetermined constant cycle. Therefore, a transfer interval to transfer a high-priority frame at a timing in synchronization with a transmission cycle is provided in a certain cycle, which makes high-priority frames transfer with a low delay and makes low-priority frames transfer in the remaining available time other than the transfer interval.

CITATION LIST

Patent Literatures

Patent Literature 1: Japanese Patent No. 4302014
Patent Literature 2: Japanese Patent No. 5094532
Patent Literature 3: Japanese Patent No. 5302559
Non Patent Literature
Non Patent Literature 1: Constantinos Dovrolis, et al. "A Case for Relative Differentiated Services and the Proportional Differentiation Model", IEEE Network September/October 1999, pp. 26-34.

SUMMARY

Technical Problem

However, according to Patent Literature 1, the relay device uses a code that is out of specification of a general-purpose network as a control code indicating an insertion position of a high-priority frame. Therefore, in order to utilize the relay device in a general-purpose network, a dedicated device that inserts and removes a high-priority frame needs to be provided on the transmitting side and the receiving side, which does not make it possible to prevent occurrence of delay jitter using a device widely available in the general network.

Further, according to Patent Literature 2, the communication device immediately transfers a high-priority frame when a transfer conflict with a low-priority frame does not occur. In contrast, when a transfer conflict with a low-priority frame occurs, the communication device needs to transfer the high-priority frame with a frame gap attached after stopping the transfer of the low-priority frame. Therefore, while being capable of transferring the high-priority frame with a low delay, the communication device cannot eliminate delay jitter.

Furthermore, according to Patent Literature 3, when a high-priority frame conflicts with a low-priority frame during a time other than the transfer interval, the network device transfers the frames according to the store-and-forward method. Therefore, the network device cannot eliminate a delay jitter of the high-priority frame. When an input-timing conflict between high-priority frames occurs, the network device transfers one of the high-priority frames that is possible to be output with a low delay, and it transfers the other frame according to the store-and-forward method. Accordingly, the other frame is temporally stored in the network device. Consequently, depending on the frame length, the network device cannot transfer the frame with a minimum amount of delay jitter.

The present invention has been achieved to solve the above problems, and an objective of the present invention is to provide a relay device and a data transfer method that prevent occurrence of delay jitter in a general-purpose network, and that are capable of preferentially transferring a frame having a special priority with a low delay and a fixed delay.

Solution to Problem

In order to solve the problem and achieve the objective mentioned above, the present invention relates to a relay device that includes: a determination unit that determines whether a received frame is a high-priority frame or a low-priority frame with a lower priority than the high-priority frame for each output port on a basis of an identifier defined in the received frame; a high-priority queue that delays the high-priority frame as determined by the determination unit for a time equal to or longer than a sum of a specified transmission gap and a frame length long enough for a downstream device to be capable of correctly receiving and transferring or discarding a frame, and that transmits the high-priority frame; a low-priority frame storing unit that stores therein the low-priority frame as determined by the determination unit; a transmission-frame selection unit that executes control to, during transmission of the low-priority frame, discontinue transmission of the low-priority frame when the high-priority frame is transmitted, and to retransmit the low-priority frame; and an output control unit that selects a frame to be transmitted to the downstream device in accordance with control performed by the transmission-frame selection unit.

Advantageous Effects of Invention

According to the relay device and the data transfer method of the present invention, an effect is obtained where occurrence of delay jitter in a general-purpose network can be prevented, and a frame having a special priority can be preferentially transferred with a low delay and a fixed delay.

DESCRIPTION OF EMBODIMENTS

Exemplary embodiments of a relay device and a data transfer method according to the present invention will be explained below in detail with reference to the accompanying drawings. The present invention is not limited to the embodiments.

First Embodiment

Figure 1:
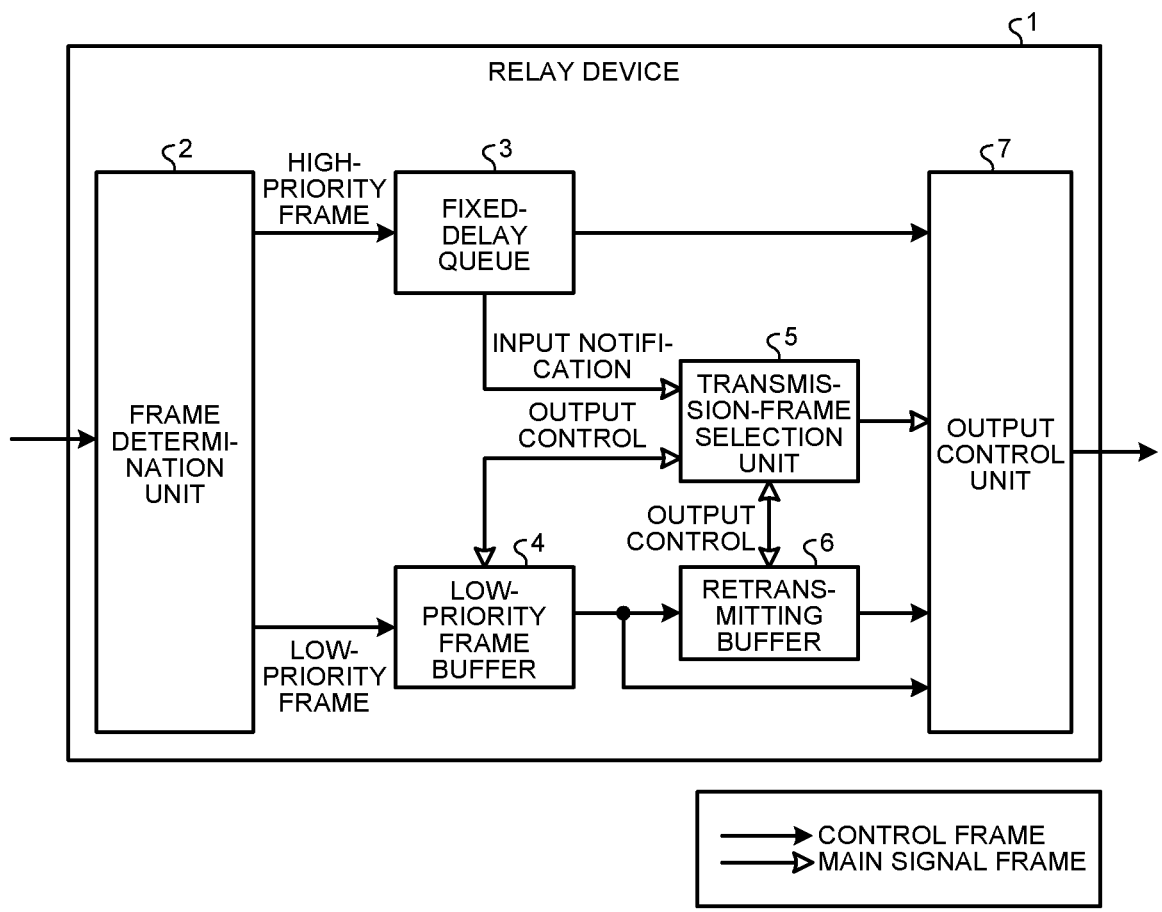
FIG. 1 is a diagram illustrating an example configuration of a relay device according to a first embodiment.

FIG. 1 is a diagram illustrating an example configuration of a relay device 1 according to a first embodiment. The relay device 1 includes a frame determination unit 2, a fixed-delay queue 3, a low-priority frame buffer 4, a transmission-frame selection unit 5, a retransmitting buffer 6, and an output control unit 7. In the present embodiment, the low-priority frame buffer 4 and the retransmitting buffer 6 constitute a low-priority frame storing unit.

The frame determination unit 2 is a determination unit that determines whether a received frame is a high-priority frame or a low-priority frame for each output port on the basis of an identifier defined in the header or the payload of the received frame. Hereinafter, a high-priority frame is defined as a frame with a special priority, and a frame other than a high-priority frame is defined as a low-priority frame, which is the frame with a lower priority than that of a high-priority frame.

The fixed-delay queue 3 is a high-priority queue that stores therein a high-priority frame as determined by the frame-determination unit 2 and that notifies the transmission-frame selection unit 5 that the high-priority frame has been input thereinto. The fixed-delay queue 3 delays the output of a high-priority frame by a specified time, and it thereafter outputs the high-priority frame to the output control unit 7.

The low-priority frame buffer 4 stores therein a low-priority frame as determined by the frame determination unit 2 and transmits an output request to the transmission-frame selection unit 5. The low-priority frame buffer 4 outputs a low-priority frame to the output control unit 7 and the retransmitting buffer 6 only when the transmission-frame selection unit 5 permits the low-priority frame buffer 4 to output the low-priority frame. Further, upon receiving an output stop command from the transmission-frame selection unit 5, the low-priority frame buffer 4 stops outputting the low-priority frame to the output control unit 7 while continuing to store the low-priority frame in the retransmitting buffer 6. In a case where the relay device 1 includes the low-priority frame buffer 4 for each output port, the configuration can be such that the low-priority frame buffer 4 includes respective queues for a plurality of priorities and identifies the priority of a low-priority frame on the basis of priority identification information set in advance or stored in the low-priority frame, and thus it is also possible to store the low-priority frame in one of the queues corresponding to the identified priority.

Upon receiving a notification from the fixed-delay queue 3 that a high-priority frame has been input, the transmission-frame selection unit 5 executes control to transmit the high-priority frame from the fixed-delay queue 3. Further, in a case where the transmission-frame selection unit 5 has not received a notification from the fixed-delay queue 3 that a high-priority frame has been input and where a low-priority frame is not stored in the retransmitting buffer 6, the transmission-frame selection unit 5 permits an output request from the low-priority frame buffer 4 and executes control to transmit a low-priority frame from the low-priority frame buffer 4. Furthermore, in a case where the transmission-frame selection unit 5 has not received a notification from the fixed-delay queue 3 that a high-priority frame has been input and where a low-priority frame is stored in the retransmitting buffer 6, the transmission-frame selection unit 5 transmits an output request to the retransmitting buffer 6 and executes control to retransmit the low-priority frame for which transfer has been discontinued from the retransmitting buffer 6.

Upon receiving a notification from the fixed-delay queue 3 that a high-priority frame has been input during transmission of a low-priority frame from the low-priority frame buffer 4 or the retransmitting buffer 6, the transmission-frame selection unit 5 executes output control such that transmission of the low-priority frame is discontinued. When transmission of a low-priority frame from the output control unit 7 is continued and completed, the transmission-frame selection unit 5 instructs the retransmitting buffer 6 to release the stored low-priority frame.

In the present embodiment, upon receiving a notification from the fixed-delay queue 3 that a high-priority frame has been input while the output of a low-priority frame is permitted, i.e., upon the occurrence of a transfer conflict, the transmission-frame selection unit 5 transmits the low-priority frame from the low-priority frame buffer 4 with a frame length of 64 bytes, for example, which is long enough for a device that is provided downstream of the relay device 1 to be capable of correctly receiving and be capable of transmitting or discarding the frame. Thereafter, the transmission-frame selection unit 5 instructs the low-priority frame buffer 4 to stop outputting the low-priority frame.

The transmission-frame selection unit 5 controls the output control unit 7 such that a frame gap between a high-priority frame and a low-priority frame for which transfer has been discontinued is definitely a specified transmission gap, specifically, a minimum inter frame gap (IFG).

The retransmitting buffer 6 stores therein a low-priority frame output from the low-priority frame buffer 4. Further, upon receiving a buffer release command from the transmission-frame selection unit 5, the retransmitting buffer 6 discards a stored low-priority frame that has already been retransmitted completely.

On the basis of the control command from the transmission-frame selection unit 5, the output control unit 7 selects a transfer frame to be transmitted to a downstream device.

The capacity of the fixed-delay queue 3 and the retransmitting buffer 6 is user settable in accordance with the system to which the relay device 1 is applied. The fixed-delay queue 3 sets a time equal to or longer than the sum of the frame length and sets the minimum IFG as a fixed delay time, where the frame length is long enough for a device downstream of the relay device 1 to be capable of correctly receiving and transferring or discarding the frame.

As described above, the relay device 1 discontinues transmission of a low-priority frame during a transfer conflict so as to be able to preferentially transfer a high-priority frame with a higher priority, i.e., earlier than a low-priority frame. Further, in the relay device 1, regardless of whether there is a transfer conflict, a high-priority frame is delayed by a fixed delay time in the fixed-delay queue 3. Therefore, the relay device 1 can achieve fixed-delay transfer.

Specifically, differences are described between the aforementioned communication device disclosed in Patent Literature 2 and the relay device 1 according to the present embodiment in a transfer process upon receiving a high-priority frame during the transferring of a low-priority frame.

Figure 2:
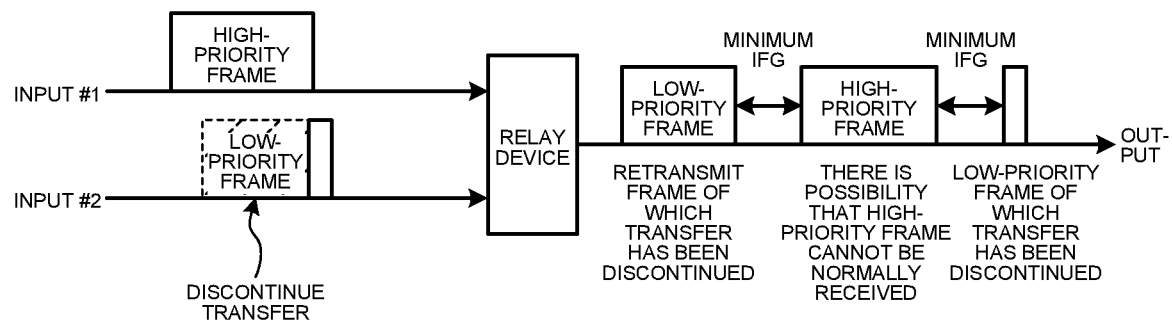
FIG. 2 is a diagram illustrating a transfer process of a high-priority frame in a communication device disclosed in Patent Literature 2.

FIG. 2 is a diagram illustrating the transfer process of a high-priority frame in the aforementioned communication device disclosed in Patent Literature 2. When the communication device receives a high-priority frame after the start of the transfer of a low-priority frame, the communication device immediately discontinues transmission of the low-priority frame. In this case, it is possible that, due to the low-priority frame for which transfer has been discontinued, a downstream device cannot correctly receive a subsequent high-priority frame. This is the case where the communication device discontinues transmission of a low-priority frame without ensuring the frame length is long enough for the downstream device to be capable of correctly discarding the frame. After transferring a high-priority frame, the communication device ensures there is a minimum IFG and then retransmits the low-priority frame for which transfer has been discontinued.

Figure 3:
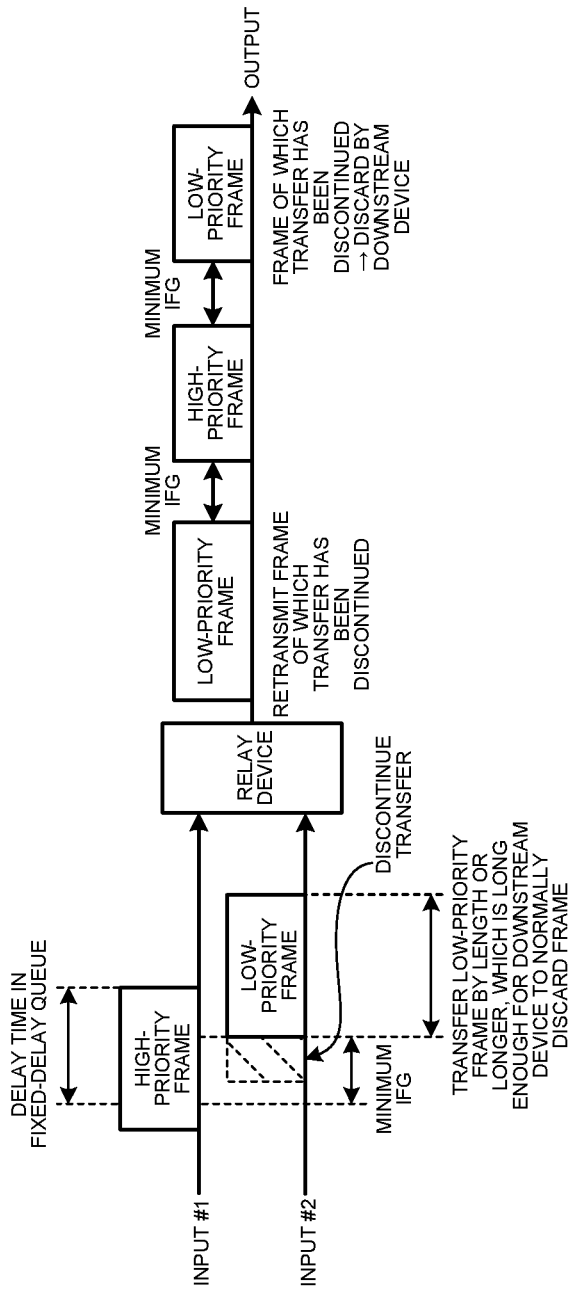
FIG. 3 is a diagram illustrating a transfer process of a high-priority frame in the relay device according to the first embodiment.

FIG. 3 is a diagram illustrating the transfer process of a high-priority frame in the relay device 1 according to the first embodiment. When the relay device 1 receives a high-priority frame after the start of the transfer of a low-priority frame, the relay device 1 discontinues transferring the low-priority frame at a point in time at which the minimum IFG is ensured to a point in time when transfer of the high-priority frame starts. With the set fixed delay time, the fixed-delay queue 3 ensures there is a frame length long enough for a device provided downstream of the relay device 1 to be capable of correctly discarding the frame. Therefore, upon receiving a low-priority frame for which transfer has been discontinued, the downstream device can discard this frame because it is an abnormal frame. The relay device 1 ensures there is a minimum IFG after transferring a high-priority frame, and then it retransmits a low-priority frame for which transfer has been discontinued.

In the relay device 1, in the case of discontinuing the transfer of a low-priority frame, the transmission-frame selection unit 5 ensures there is a minimum IFG from the point in time at which the transfer of a high-priority frame starts and continues the transfer of the low-priority frame for as long as possible. However, the control in the relay device 1 is not limited to the control as described above. For example, the configuration may be such that the transmission-frame selection unit 5 confirms that a low-priority frame has been transmitted with a frame length long enough for a device downstream of the relay device 1 to be capable of correctly discarding the frame, and thereafter it discontinues the transfer of the low-priority frame before the point in time at which the minimum IFG is ensured to the point in time when transfer of a high-priority frame starts.

Figure 4:
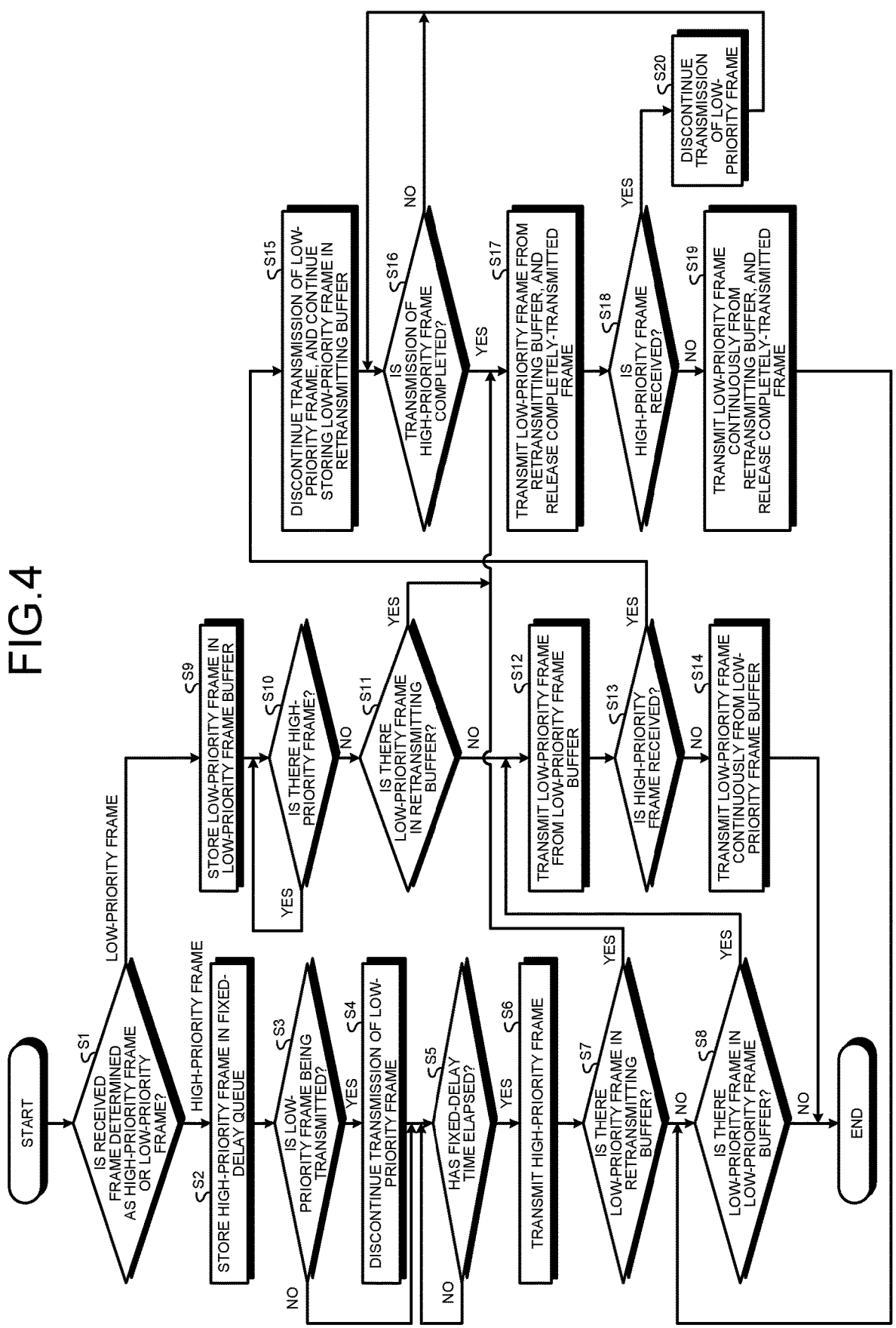
FIG. 4 is a flowchart illustrating a data transfer method in the relay device according to the first embodiment.

A data transfer method in the relay device 1 is described with reference to a flowchart. FIG. 4 is a flowchart illustrating the data transfer method in the relay device 1 according to the first embodiment.

In the relay device 1, the frame determination unit 2 determines whether a received frame is a high-priority frame or a low-priority frame (Step S1). When the received frame is a high-priority frame (high-priority frame at Step S1), the frame determination unit 2 stores the high-priority frame in the fixed-delay queue 3 (Step S2). When a low-priority frame is being transmitted (YES at Step S3), the transmission-frame selection unit 5 executes control to discontinue transmission of the low-priority frame (Step S4). When a low-priority frame is not being transmitted (NO at Step S3), the transmission-frame selection unit 5 skips Step S4. The fixed-delay queue 3 notifies the transmission-frame selection unit 5 of the input of the high-priority frame and continues storing therein the high-priority frame until a fixed delay time has elapsed, which is set equal to or longer than the sum of the minimum IFG and the frame length long enough for a device downstream of the relay device 1 to be capable of correctly receiving and transferring or discarding the frame (NO at Step S5). When the fixed delay time has elapsed (YES at Step S5), the transmission-frame selection unit 5 executes control to transmit the high-priority frame from the output control unit 7 (Step S6).

When there is no low-priority frame in the retransmitting buffer 6 (NO at Step S7), and also when there is no low-priority frame in the low-priority frame buffer 4 (NO at Step S8), the transmission-frame selection unit 5 ends the process. In contrast, when there is a low-priority frame in the retransmitting buffer 6 (YES at Step S7), the transmission-frame selection unit 5 performs a process at Step S17 described later. When there is a low-priority frame in the low-priority frame buffer 4 (YES at Step S8), the transmission-frame selection unit 5 performs a process at Step S12 described later.

Again regarding Step S1, when a received frame is a low-priority frame (low-priority frame at Step S1), the frame determination unit 2 stores the low-priority frame in the low-priority frame buffer 4 (Step S9). Upon receiving an output request from the low-priority frame buffer 4, when there is a high-priority frame, i.e., the transmission-frame selection unit 5 has received an input notification from the fixed-delay queue 3 (YES at Step S10), the transmission-frame selection unit 5 does not permit the output request for a low-priority frame. When there is no high-priority frame, i.e., when the transmission-frame selection unit 5 has not received an input notification from the fixed-delay queue 3 (NO at Step S10), and also when there is no low-priority frame in the retransmitting buffer 6 (NO at Step S11), then the transmission-frame selection unit 5 executes control to transmit a low-priority frame from the low-priority frame buffer 4 (Step S12). When no high-priority frame is received during transmission of the low-priority frame from the low-priority frame buffer 4 (NO at Step S13), the transmission-frame selection unit 5 continues transmitting the low-priority frame from the low-priority frame buffer 4 and ends the process (Step S14).

When a high-priority frame is received during transmission of the low-priority frame from the low-priority frame buffer 4 (YES at Step S13), the transmission-frame selection unit 5 executes control to discontinue transmission of the low-priority frame from the low-priority frame buffer 4 and to continue storing the low-priority frame from the low-priority frame buffer 4 in the retransmitting buffer 6 (Step S15). The transmission-frame selection unit 5 is on standby until transmission of a high-priority frame is completed (NO at Step S16). After the completion of transmission of the high-priority frame (YES at Step S16), the transmission-frame selection unit 5 transmits the low-priority frame from the retransmitting buffer 6 and releases the completely-transmitted low-priority frame from the retransmitting buffer 6 (Step S17). At Step S11, when there is a low-priority frame in the retransmitting buffer 6 (YES at Step S11), the transmission-frame selection unit 5, similarly to the above process, executes control to transmit the low-priority frame from the retransmitting buffer 6 (Step S17).

When no high-priority frame is received during transmission of a low-priority frame from the retransmitting buffer 6 (NO at Step S18), the transmission-frame selection unit 5 continues transmitting the low-priority frame from the retransmitting buffer 6 and releases the completely-transmitted low-priority frame from the retransmitting buffer 6 (Step S19), and the process proceeds to Step S8. When a high-priority frame is received during transmission of a low-priority frame from the retransmitting buffer 6 (YES at Step S18), the transmission-frame selection unit 5 executes control to discontinue transmission of the low-priority frame from the retransmitting buffer 6 (Step S20), and the process proceeds to Step S16.

As described above, according to the present embodiment, upon receiving a high-priority frame after the start of the transfer of a low-priority frame, the relay device 1 discontinues the transfer of the low-priority frame at a point in time at which the minimum IFG is ensured with respect to a point in time when transfer of the high-priority frame starts; delays the high-priority frame by a fixed delay time that is set equal to or longer than the sum of the minimum IFG and a frame length long enough for a downstream device to be capable of correctly discarding the frame; and then transmits the high-priority frame. Due to this operation, the relay device 1 can prevent the occurrence of delay jitter in a general-purpose network and can preferentially transfer a frame having a special priority with a fixed delay. Further, upon receiving a low-priority frame for which transfer has been discontinued, the downstream device can discard this frame as an abnormal frame.

Second Embodiment

In the first embodiment, the retransmitting buffer 6 is provided separately from the low-priority frame buffer 4, but they do not necessarily have to be separately provided. In a second embodiment, a case is described where it is possible to retransmit a frame from a low-priority frame buffer.

Configurations identical to those of the first embodiment are annotated with like reference numbers and detailed descriptions thereof are omitted.

Figure 5:
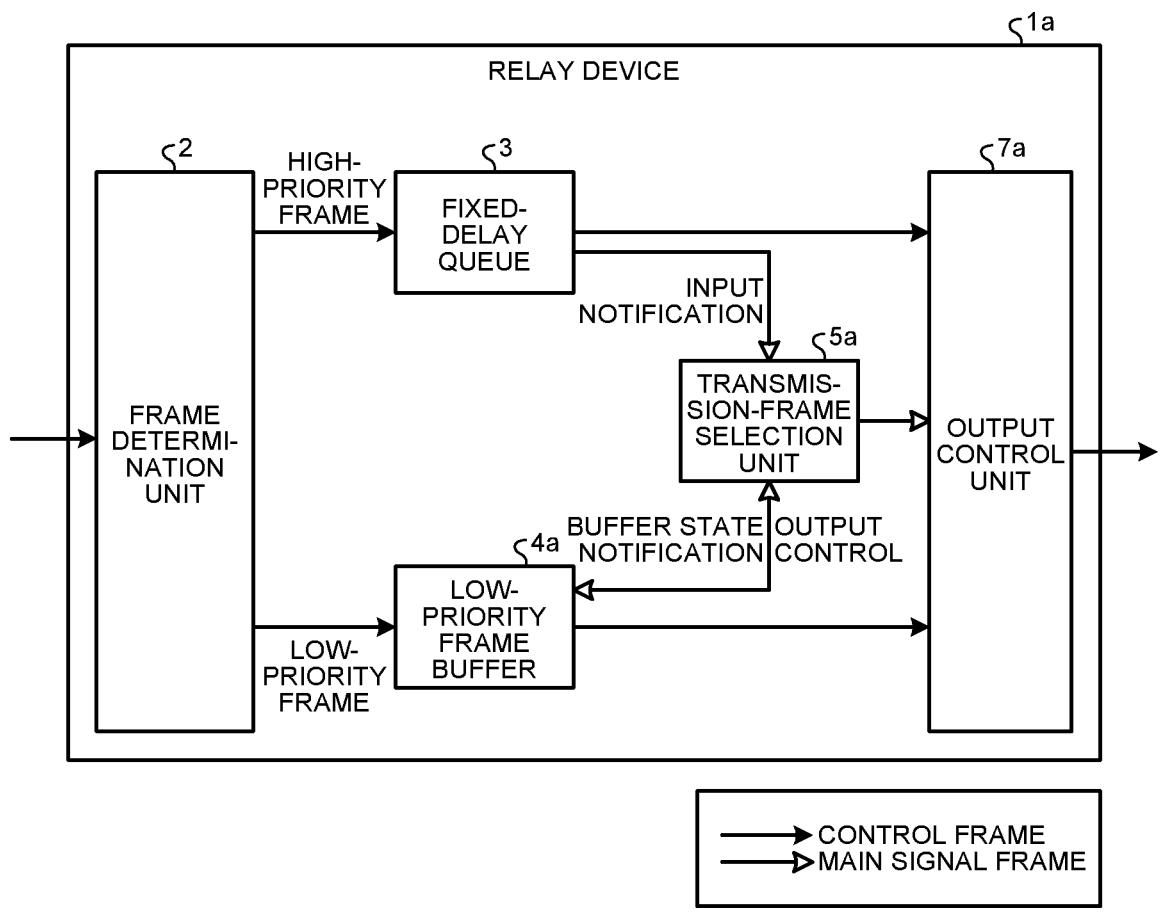
FIG. 5 is a diagram illustrating an example configuration of a relay device according to a second embodiment.

FIG. 5 is a diagram illustrating an example configuration of a relay device 1a according to the second embodiment. In comparison with the relay device 1, the relay device 1a omits the retransmitting buffer 6 and replaces the low-priority frame buffer 4, the transmission-frame selection unit 5, and the output control unit 7 with a low-priority frame buffer 4a, a transmission-frame selection unit 5a, and an output control unit 7a, respectively. In the present embodiment, the low-priority frame buffer 4a is a low-priority frame storing unit.

The low-priority frame buffer 4a stores therein a low-priority frame as determined by the frame determination unit 2 and transmits an output request to the transmission-frame selection unit 5a. At this time, the low-priority frame buffer 4a transmits, along with the output request, a buffer-state notification that is information indicating a frame length of the stored low-priority frame to the transmission-frame selection unit 5a. The low-priority frame buffer 4a outputs a low-priority frame to the output control unit 7a only when the transmission-frame selection unit 5a permits the low-priority frame buffer 4a to output the low-priority frame. Upon receiving an output stop command from the transmission-frame selection unit 5a, the low-priority frame buffer 4a does not discard a sending low-priority frame, but holds data of the low-priority frame stored therein in a state of being able to be retransmitted, and stops outputting the low-priority frame to the output control unit 7a. In a case where the relay device 1a includes the low-priority frame buffer 4a for each output port, the configuration can be such that the low-priority frame buffer 4a includes respective queues for a plurality of priorities for each output port and identifies the priority of a low-priority frame on the basis of priority identification information set in advance or stored in the low-priority frame, and thus it is also possible to store the low-priority frame in one of the queues corresponding to the identified priority.

Upon receiving a notification from the fixed-delay queue 3 that a high-priority frame has been input, the transmission-frame selection unit 5a executes control to transmit the high-priority frame from the fixed-delay queue 3. Further, when the transmission-frame selection unit 5a has not received a notification from the fixed-delay queue 3 that a high-priority frame has been input, or when it is possible to complete outputting the leading low-priority frame in the low-priority frame buffer 4a while a high-priority frame is kept waiting for a fixed delay time, the transmission-frame selection unit 5a executes control to permit an output request from the low-priority frame buffer 4a and to transmit a low-priority frame from the low-priority frame buffer 4a.

Upon receiving a notification from the fixed-delay queue 3 that a high-priority frame has been input during transmission of a low-priority frame from the low-priority frame buffer 4a, the transmission-frame selection unit 5a executes output control to discontinue transmission of the low-priority frame. After completion of the transmission of the high-priority frame, the transmission-frame selection unit 5a executes control to retransmit the low-priority frame from the beginning, which has been stored in the low-priority frame buffer 4a because its transfer has been discontinued. When transmission of the low-priority frame from the output control unit 7a is continued and completed, the transmission-frame selection unit 5a instructs the low-priority frame buffer 4a to release the stored low-priority frame.

In the present embodiment, upon receiving a notification from the fixed-delay queue 3 that a high-priority frame has been input while permitting the output of a low-priority frame, i.e., upon the occurrence of a transfer conflict, the transmission-frame selection unit 5a transmits the low-priority frame from the low-priority frame buffer 4a with a frame length of 64 bytes, for example, which is a length long enough for a device downstream of the relay device 1a to be capable of correctly receiving and transmitting or discarding the frame. Thereafter, the transmission-frame selection unit 5a instructs the low-priority frame buffer 4a to stop outputting the low-priority frame.

The transmission-frame selection unit 5a controls the output control unit 7a in such a manner that a frame gap between a high-priority frame and a low-priority frame for which the transfer has been discontinued is definitely a specified transmission gap, specifically, the minimum IFG.

The output control unit 7a is an output control means that selects a transfer frame to be transmitted to a downstream device on the basis of the control command from the transmission-frame selection unit 5a.

The capacity of the fixed-delay queue 3 and the low-priority frame buffer 4a is user settable in accordance with the system to which the relay device 1a is applied. The fixed-delay queue 3 sets a time equal to or longer than the sum of the frame length and the minimum IFG as a fixed delay time, where the frame length is long enough for a device downstream of the relay device 1a to be capable of correctly receiving and transferring or discarding the frame.

As described above, the relay device 1a discontinues transmission of a low-priority frame when a transfer conflict occurs, and therefore it can preferentially transfer a high-priority frame provided with a special priority. Further, in the relay device 1a, regardless of whether there is a transfer conflict, a high-priority frame is delayed by a fixed delay time in the fixed-delay queue 3 so that the relay device 1a can achieve a fixed-delay transfer.

In the relay device 1a, in the case of discontinuing the transfer of a low-priority frame, the transmission-frame selection unit 5a ensures there is the minimum IFG from a point in time at which the transfer of a high-priority frame starts, and it continues transferring the low-priority frame for as long as possible. However, the control executed in the relay device 1a is not limited to the control as described above. For example, the configuration can such that the transmission-frame selection unit 5a confirms that a low-priority frame has been transmitted with a frame length long enough for a device downstream of the relay device 1a to be capable of correctly receiving and transferring or discarding the frame, and thereafter it discontinues the transfer of the low-priority frame before the point in time at which the minimum IFG is ensured to the point in time at which the transfer of a high-priority frame starts.

Figure 6:
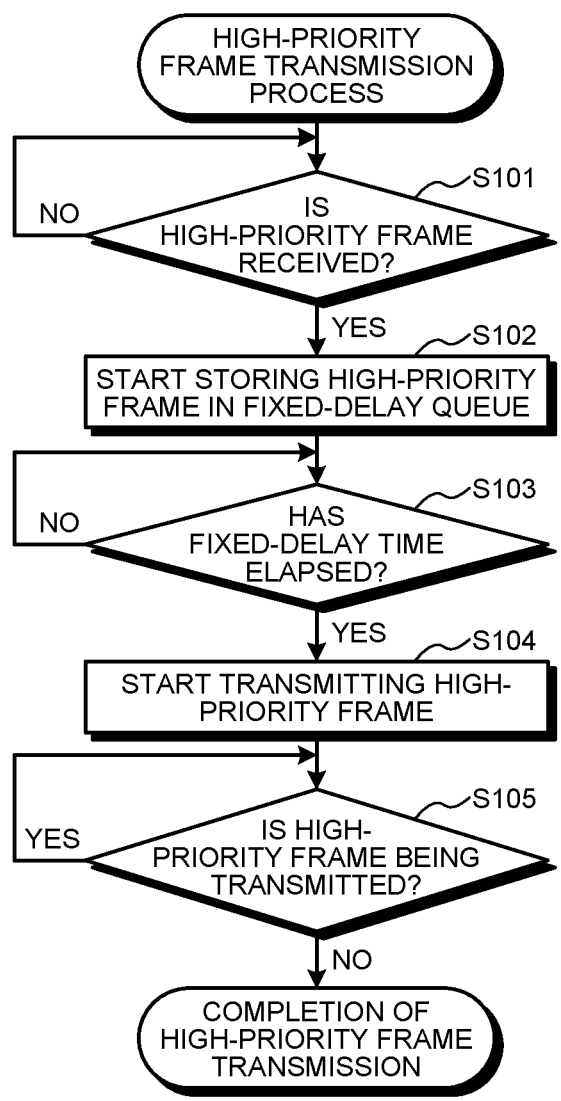
FIG. 6 is a flowchart illustrating a data transfer method of a high-priority frame in the relay device according to the second embodiment.

Next, a data transfer method in the relay device 1a is described with reference to a flowchart. FIG. 6 is a flowchart illustrating a data transfer method of a high-priority frame in the relay device 1a according to the second embodiment.

In the relay device 1a, the frame determination unit 2 determines whether a received frame is a high-priority frame or a low-priority frame (Step S101). When the frame determination unit 2 does not receive a high-priority frame (NO at Step S101), the frame determination unit 2 is on standby until it receives a high-priority frame. When the frame determination unit 2 receives a high-priority frame (YES at Step S101), the frame determination unit 2 starts storing the high-priority frame in the fixed-delay queue 3 (Step S102). The fixed-delay queue 3 notifies the transmission-frame selection unit 5a of the input of the high-priority frame and continues storing therein the high-priority frame until a fixed delay time has elapsed, which is set equal to or longer than the sum of the minimum IFG and the frame length long enough for a device downstream of the relay device 1a to be capable of correctly receiving and transferring or discarding the frame (NO at Step S103). When the fixed delay time has elapsed (YES at Step S103), the transmission-frame selection unit 5a executes control to start transmission of the high-priority frame from the output control unit 7a (Step S104). The output control unit 7a continues transmitting the high-priority frame (YES at Step S105). Upon completion of the transmission of the high-priority frame (NO at Step S105), the transmission process ends.

Figure 7:
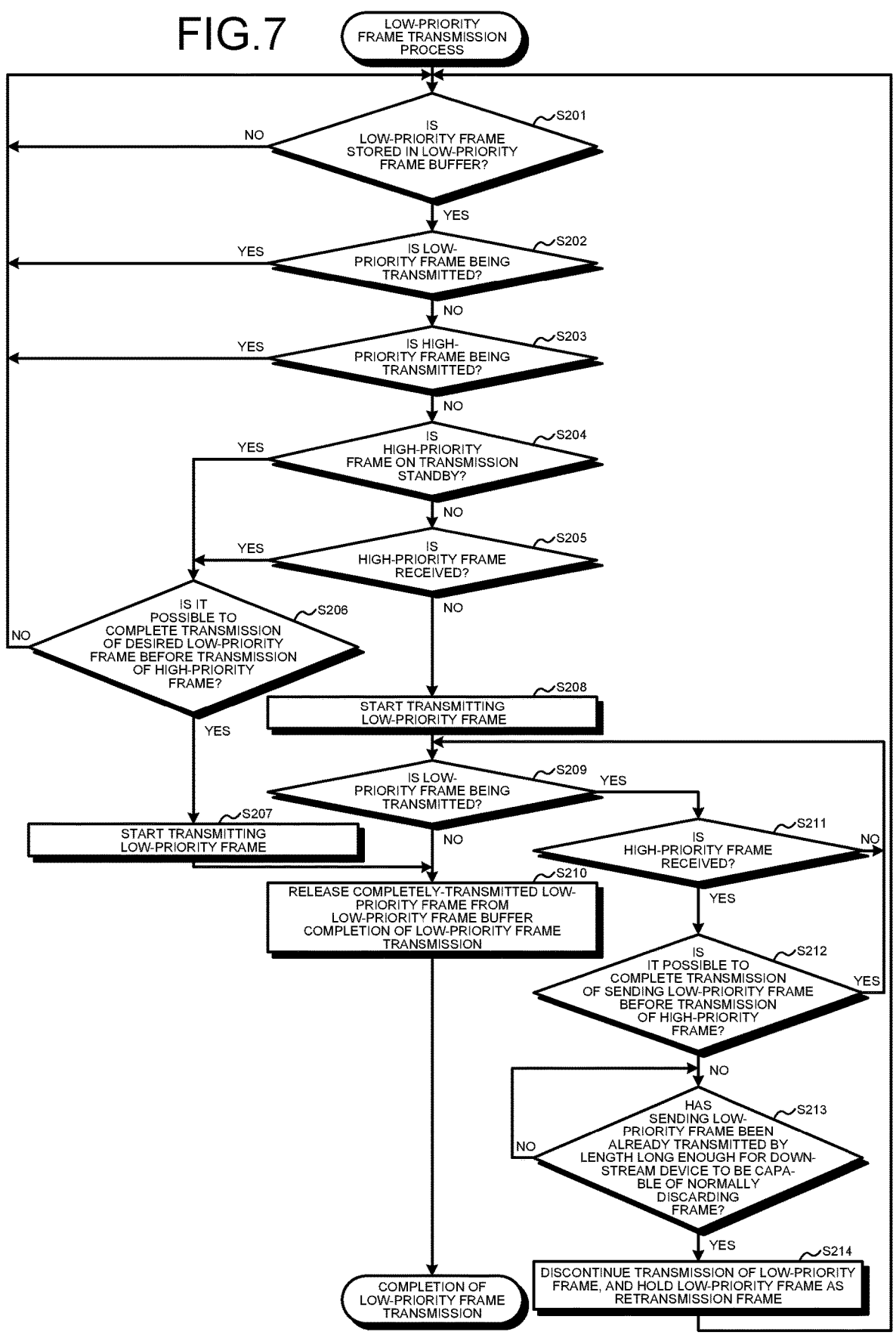
FIG. 7 is a flowchart illustrating a data transfer method of a low-priority frame in the relay device according to the second embodiment.

FIG. 7 is a flowchart illustrating a data transfer method of a low-priority frame in the relay device 1a according to the second embodiment. In the relay device 1a, the frame determination unit 2 determines whether a received frame is a high-priority frame or a low-priority frame. When the received frame is a low-priority frame, the frame determination unit 2 stores the low-priority frame in the low-priority frame buffer 4a.

When the low-priority frame is stored in the low-priority frame buffer 4a (YES at Step S201) and when a low-priority frame is not being transmitted (NO at Step S202) and when a high-priority frame is not being transmitted (NO at Step S203), the transmission-frame selection unit 5a performs transmission of the low-priority frame according to the following procedure.

When a high-priority frame is on transmission standby (YES at Step S204), or when a high-priority frame is not on transmission standby (NO at Step S204) but a high-priority frame is received (YES at Step S205), the transmission-frame selection unit 5a determines, on the basis of a frame length of a leading low-priority frame that is desired to be transmitted from the low-priority frame buffer 4a, whether it is possible to complete the desired transmission of the low-priority frame before transmission of the high-priority frame (Step S206). When the transmission-frame selection unit 5a determines that it is possible to complete the desired transmission of the low-priority frame (YES at Step S206), the transmission-frame selection unit 5a executes control to start the transmission of the low-priority frame from the low-priority frame buffer 4a (Step S207). When transmission of the low-priority frame from the low-priority frame buffer 4a is continued and completed, the transmission-frame selection unit 5a releases the completely-transmitted low-priority frame from the low-priority frame buffer 4a (Step S210), and the transmission process ends.

When a high-priority frame is not received (NO at Step S205), the transmission-frame selection unit 5a controls that it starts transmission of a low-priority frame from the low-priority frame buffer 4a (Step S208). The transmission-frame selection unit 5a confirms whether, during transmission of the low-priority frame from the low-priority frame buffer 4a (YES at Step S209), a high-priority frame is received (Step S211). When a high-priority frame is not received (NO at Step S211), and when transmission of the low-priority frame from the low-priority frame buffer 4a is continued and completed (NO at Step S209), the transmission-frame selection unit 5a releases the completely-transmitted low-priority frame from the low-priority frame buffer 4a (Step S210), and the transmission process ends.

When a high-priority frame is received (YES at Step S211), the transmission-frame selection unit 5a determines whether it is possible to complete transmission of the low-priority frame being transmitted from the low-priority frame buffer 4a before transmission of the high-priority frame (Step S212). When it is determined that the transmission of the low-priority frame being transmitted from the low-priority frame buffer 4a can be completed before transmission of the high-priority frame (YES at Step S212) and when transmission of the low-priority frame from the low-priority frame buffer 4a is continued and then completed (NO at Step S209), the transmission-frame selection unit 5a releases the completely-transmitted low-priority frame from the low-priority frame buffer 4a (Step S210), and the transmission process ends.

When it is determined not to be possible to complete transmission of the low-priority frame being transmitted from the low-priority frame buffer 4a before transmission of a high-priority frame (NO at Step S212), the transmission-frame selection unit 5a confirms whether the low-priority frame, which is being sent, has been already transmitted by a length long enough for a downstream device to be capable of correctly discarding the frame (Step S213). When the low-priority frame, which is being sent, has already been transmitted by a length long enough for the downstream device to be capable of correctly receiving and transferring or discarding the frame (YES at Step S213), the transmission-frame selection unit 5a discontinues transmission of the low-priority frame being transmitted from the low-priority frame buffer 4a. The low-priority frame buffer 4a does not release, but stores therein data of the low-priority frame for which transmission has been discontinued for the purpose of retransmission of the data, and holds therein the data as a retransmission frame (Step S214). Thereafter the process returns to Step S201.

When the sending low-priority frame has not yet been transmitted by a length long enough for the downstream device to be capable of correctly receiving and transferring or discarding the frame (NO at Step S213), the transmission-frame selection unit 5a continues transmission of the low-priority frame being transmitted from the low-priority frame buffer 4a until the sending low-priority frame is transmitted by a length long enough for the downstream device to be capable of correctly receiving the frame and transferring or discarding the frame. When the low-priority frame has been transmitted by a length long enough for the downstream device to be capable of correctly receiving and transferring or discarding the frame (YES at Step S213), the transmission-frame selection unit 5a discontinues transmission of the low-priority frame being transmitted from the low-priority frame buffer 4a. The low-priority frame buffer 4a does not release but stores therein data of the low-priority frame for which transmission has been discontinued for retransmission of the data, and holds therein the data as a retransmission frame (Step S214). Thereafter, the process returns to Step S201.

When a low-priority frame is not stored in the low-priority frame buffer 4a (NO at Step S201) or when a low-priority frame is being transmitted (YES at Step S202) or when a high-priority frame is being transmitted (YES at Step S203) or when desired transmission of a low-priority frame cannot be completed before transmission of a high-priority frame (NO at Step S206), the transmission-frame selection unit 5 returns the process to Step S201.

In the present embodiment, a data transfer method of a high-priority frame and a low-priority frame has been described with reference to FIGS. 6 and 7. However, at Step S206 in FIG. 7, when it is not assumed that a low-priority frame is transmitted before transmission of a high-priority frame, it is possible to describe the data transfer method by modifying the flowchart in FIG. 4 used in the first embodiment. In this case, in FIG. 4, Steps S7, S11, and S17 to S20 are omitted. Subsequently to Step S6, the process at Step S8 is performed. Subsequently to Step S10, the process at Step S12 is performed. Subsequently to Step S16, the process at Step S12 is performed. At Step S15, the process of continuing to store a low-priority frame from the low-priority frame buffer 4 in the retransmitting buffer 6 is omitted. Further, in the descriptions of the first embodiment, the relay device 1 is replaced by the relay device 1a, the low-priority frame buffer 4 is replaced by the low-priority frame buffer 4a, the transmission-frame selection unit 5 is replaced by the transmission-frame selection unit 5a, and the output control unit 7 is replaced by the output control unit 7a so as to make it possible to correspond to the above case.

As described above, according to the present embodiment, in the relay device 1a, a low-priority frame determined by the frame determination unit 2 is stored in the low-priority frame buffer 4a. Further, when transmission of the low-priority frame is discontinued, the relay device 1a does not discard the sending low-priority frame but holds data of the low-priority frame remaining and stored in the low-priority frame buffer 4a. Due to this configuration, the relay device 1a has a more simplified configuration as compared to the first embodiment and can still achieve identical effects as those in the first embodiment.

Third Embodiment

In the first and second embodiments, operations of the relay device having a two-port configuration have been described. However, this is merely an example, and the number of ports in the relay device is not limited to two. Therefore, it is still possible for a relay device provided with three or more ports to have a configuration identical to the relay device in the first and second embodiments. In the case of a configuration having three or more ports, it is necessary to process in advance input frames from a plurality of ports, which are output from the frame determination unit 2 in the relay device of the first and second embodiments, such that a transfer conflict between frames with the same priority does not occur. In a third embodiment of the present invention, described is a high-priority frame conflict control method for a relay device provided with three or more ports. Configurations identical to those of the first and second embodiments are annotated with like reference signs and detailed descriptions thereof are omitted.

Figure 8:
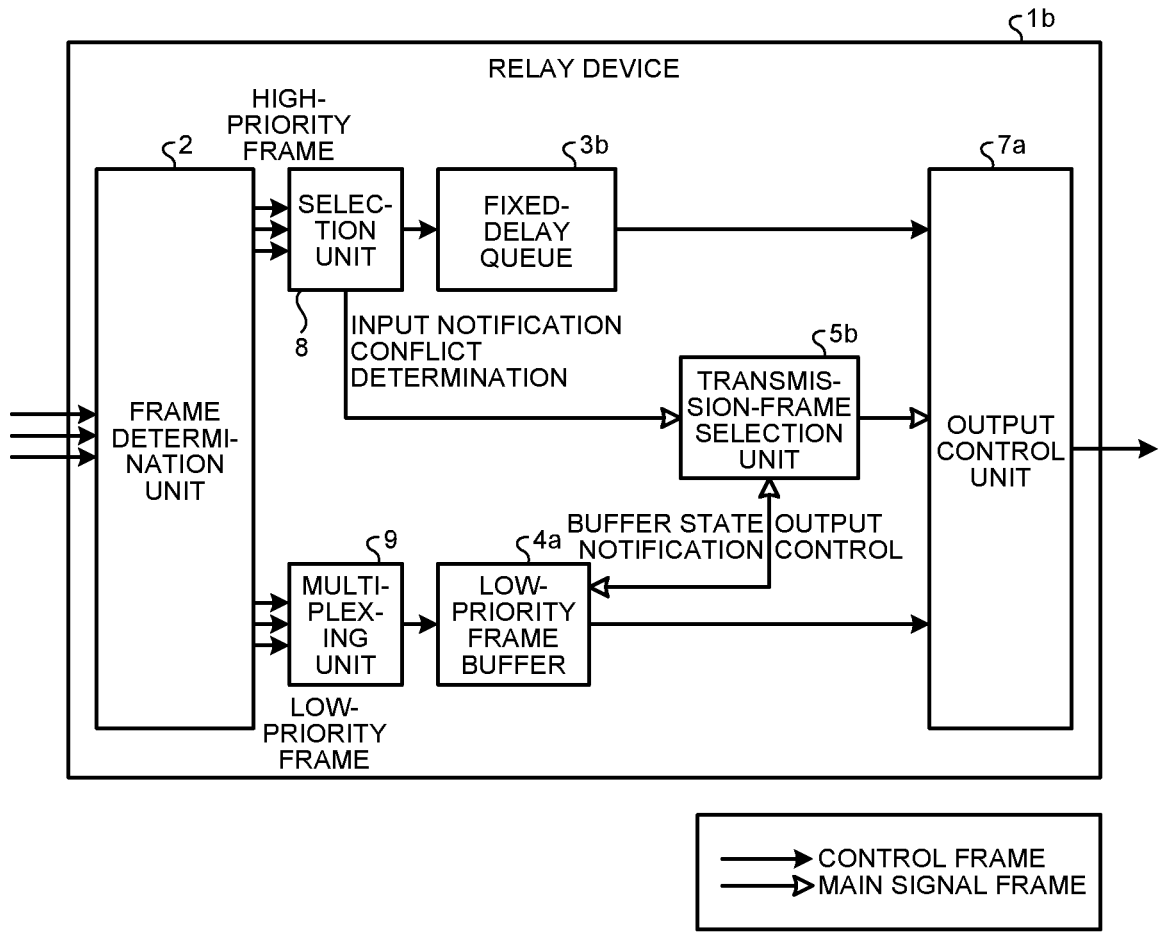
FIG. 8 is a diagram illustrating an example configuration of a relay device according to a third embodiment.

FIG. 8 is a diagram illustrating an example configuration of a relay device 1b according to the third embodiment. In comparison to the relay device 1a, the relay device 1b replaces the fixed-delay queue 3 and the transmission-frame selection unit 5a with a fixed-delay queue 3b and a transmission-frame selection unit 5b, respectively, and further adds a selection unit 8 and a multiplexing unit 9. In the relay device 1b, the frame determination unit 2 is implemented to each input port; and the fixed-delay queue 3b, the low-priority frame buffer 4a, the transmission-frame selection unit 5b, the output control unit 7a, the selection unit 8, and the multiplexing unit 9 are implemented for each output port.

The frame determination unit 2 determines a frame received through each input port whether a high-priority frame or a low-priority frame for each output port on the basis of an identifier defined in the header or the payload of the received frame or on the basis of a preset identifier described later. Hereinafter, a high-priority frame is defined as a frame with a special priority and a low-priority frame is defined as a frame with a lower priority than the high-priority frame.

On the basis of an identifier defined in the header or the payload of respective high-priority frames received from a plurality of input ports, or on the basis of a preset identifier described later, the selection unit 8 determines the priority of each of high-priority frames with their reception timings overlapping each other and selects a frame with the highest priority from among the conflicting high-priority frames. The selection unit 8 outputs the selected highest-priority frame to the fixed-delay queue 3b and discards the remaining conflicting high-priority frames. The selection unit 8 notifies the transmission-frame selection unit 5b that high-priority frames have been input and also notifies information of the highest-priority frame output to the fixed-delay queue 3b, which is a determination result of the conflicting high-priority frames. It may be configured that the selection unit 8 does not discard the remaining conflicting high-priority frames but outputs them to the fixed-delay queue 3b, and the fixed-delay queue 3b discards these remaining conflicting high-priority frames.

Examples of the preset identifier, to be used for determining the priority in the frame determination unit 2 and the selection unit 8, include an identifier that identifies each input port in a case where the priority is set to each input port. By setting the priority to each input port in advance, the frame determination unit 2 and the selection unit 8 can determine the priority of a received frame on the basis of information of the input-port. For example, the frame determination unit 2 and the selection unit 8 define a frame received from a specific input port as a high-priority frame and define frames received from the other input ports as a low-priority frame. The preset identifier is not limited to the identifier that identifies each input port with a set priority.

The fixed-delay queue 3b is a high-priority queue that stores therein a high-priority frame with a higher priority (hereinafter, referred to as "high-priority frame HIGH") among the high-priority frames, which is selected by the selection unit 8. The fixed-delay queue 3b stores therein the high-priority frame HIGH from the beginning. When, in the fixed-delay queue 3b, a high-priority frame with a lower priority (hereinafter, referred to as "high-priority frame LOW") than the high-priority frame HIGH has been stored already and when, in consideration of the IFG, an output timing of the high-priority frame HIGH overlaps with an output timing of the high-priority frame LOW, the fixed-delay queue 3b does not output the high-priority frame LOW but delays the high-priority frame HIGH by a specified time and, thereafter, outputs this high-priority frame HIGH to the output control unit 7a. The fixed-delay queue 3b discards the high-priority frame LOW that has been delayed for a specified time or longer, that is, for a fixed delay time or longer.

The multiplexing unit 9 executes control to multiplex low-priority frames received from the input ports and determined by the frame determination unit 2.

Upon receiving a notification from the selection unit 8 that a high-priority frame has been input, the transmission-frame selection unit 5b executes control to transmit the high-priority frame from the fixed-delay queue 3b, which is a transmission-frame selection means. When, after receiving a notification from the selection unit 8 that a high-priority frame LOW has been input, the transmission-frame selection unit 5b receives a notification that a high-priority frame HIGH has been input, which has an output timing conflicting with the high-priority frame LOW, the transmission-frame selection unit 5b executes control the output of only the high-priority frame HIGH after a lapse of fixed delay time from the fixed-delay queue 3b and also performs a process of discarding the high-priority frame LOW with its output timing conflicting with the high-priority frame HIGH. That is, the transmission-frame selection unit 5b executes control, on the basis of the determination result in the selection unit 8, to transmit the highest-priority frame among the conflicting high-priority frames with a fixed delay and to discard the remaining conflicting high-priority frames. As described previously, the process of discarding a high-priority frame LOW is executed by the selection unit 8 in some cases and is executed by the fixed-delay queue 3b in some cases. The control in the transmission-frame selection unit 5b to permit an output request from the low-priority frame buffer 4a and to transmit a low-priority frame from the low-priority frame buffer 4a is similar to the process in the second embodiment.

In the present embodiment, when, after receiving a notification that a high-priority frame LOW has been input, the transmission-frame selection unit 5b receives a notification that a high-priority frame HIGH has been input within the length of transfer time obtained by adding the minimum IFG to a frame length of the high-priority frame LOW, the transmission-frame selection unit 5b needs to determine that a transfer conflict between the high-priority frame LOW and the high-priority frame HIGH has occurred. Therefore, the fixed-delay queue 3b delays the high-priority frame HIGH for a fixed delay time equal to or longer than a data transfer time by the length of "the minimum IFG+the maximum frame length of the high-priority frame LOW which may conflict with the high-priority frame HIGH". This is defined as a fixed delay time.

On the basis of a control command from the transmission-frame selection unit 5b, the output control unit 7a selects a transfer frame to be transmitted to a downstream device.

As described above, in the relay device 1b, a high-priority frame, which is desired to be transferred with a top priority among conflicting high-priority frames, is delayed by a fixed delay time by the fixed-delay queue 3b and then output. Therefore, the relay device 1b can achieve fixed-delay transfer.

Figure 9:
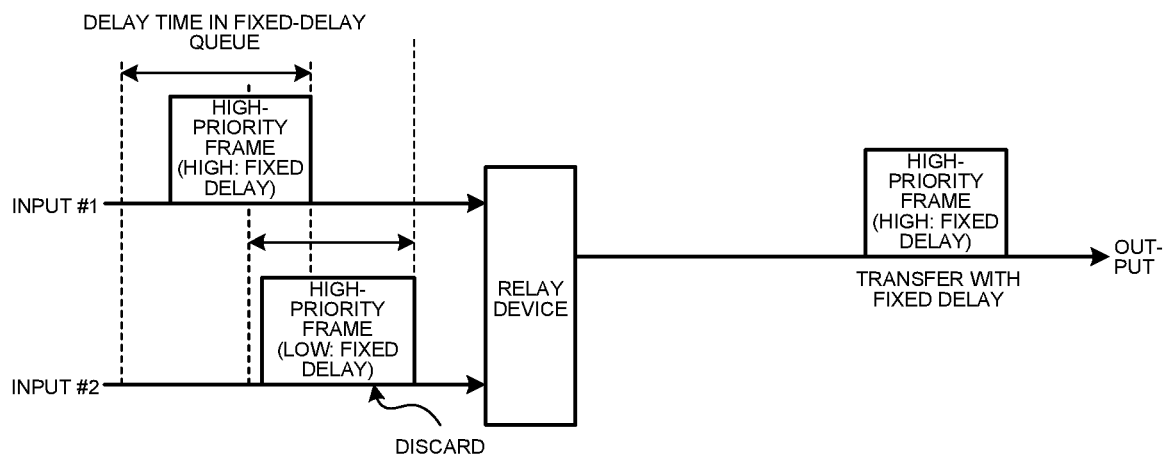
FIG. 9 is a diagram illustrating a transfer process when output timings of high-priority frames conflict with each other in the relay device according to the third embodiment.

FIG. 9 is a diagram illustrating a transfer process when output timings of high-priority frames conflict with each other in the relay device 1b according to the third embodiment. When, after start of receiving a high-priority frame LOW, the relay device 1b starts receiving a high-priority frame HIGH and when, in consideration of the IFG, output timings of these frames conflict with each other, the relay device 1b discards the high-priority frame LOW and transfers only the high-priority frame HIGH with a fixed delay. While in FIG. 9, there are two high-priority frames to be input, this is merely an example. Likewise, in a case with three or more high-priority frames, only a high-priority frame with the highest priority among conflicting high-priority frames is transferred with a fixed delay, and the remaining conflicting high-priority frames are discarded.

Figure 10:
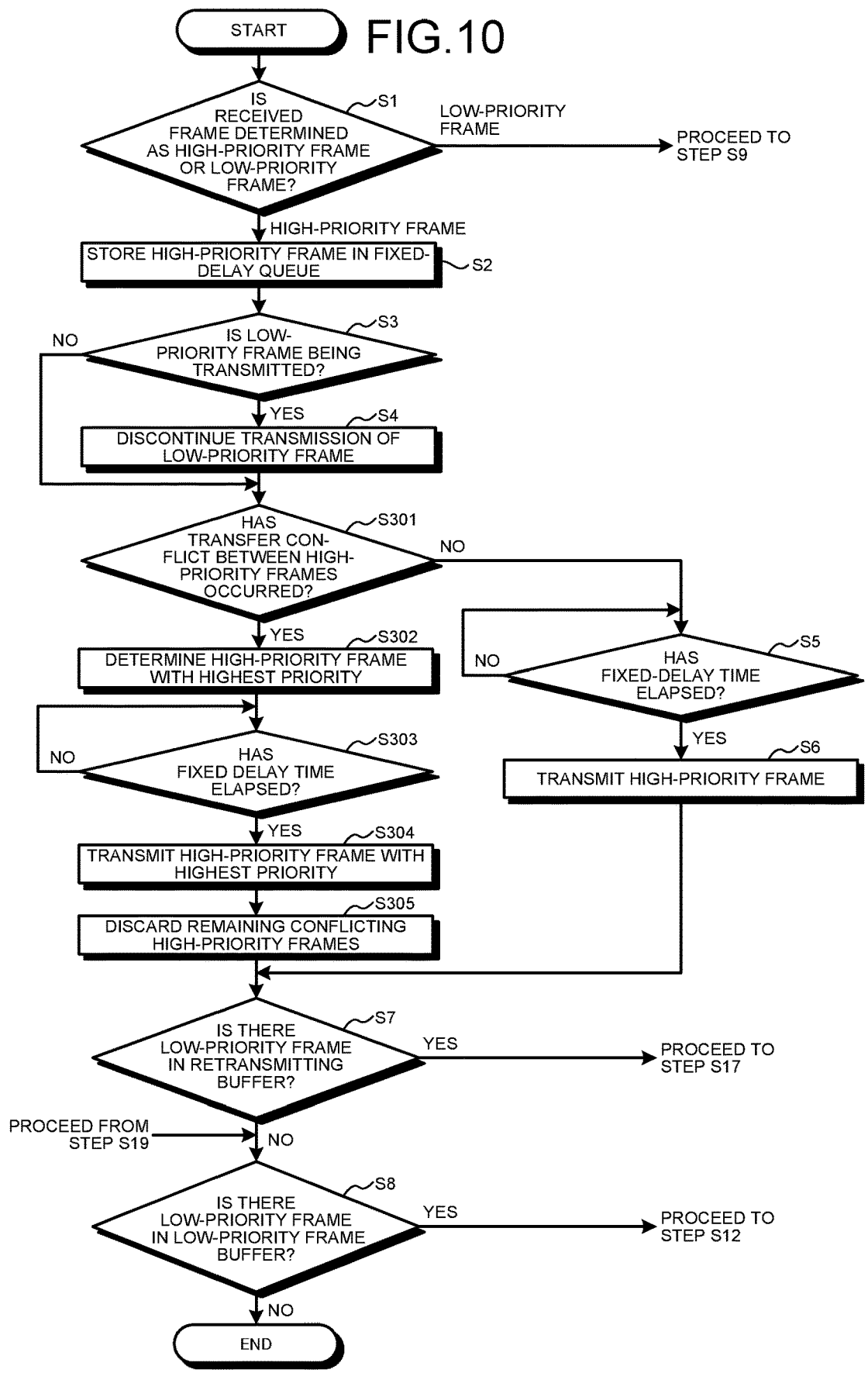
FIG. 10 is a flowchart illustrating a data transfer method in the relay device according to the third embodiment.

A data transfer method in the relay device 1b is described with reference to a flowchart. FIG. 10 is a flowchart illustrating the data transfer method in the relay device 1b according to the third embodiment. Hereinafter, only a part of the process, illustrated on the left side of the flowchart in FIG. 4 in the first embodiment, is described, which relates to high-priority frame processing. The processes at Steps S9 to S20, which relate to transmission of a low-priority frame, are identical to those in the first embodiment and therefore descriptions thereof are omitted. Further, the processes at Steps S1 to S8, which relate to high-priority frame processing, are identical to those in the first embodiment and therefore descriptions thereof are omitted.

In the relay device 1b, when, after Step S4 or after NO at Step S3, a transfer conflict between a plurality of high-priority frames has occurred (YES at Step S301), the selection unit 8 determines the priority of each of the conflicting high-priority frames on the basis of an identifier defined in the received frame or on the basis of a preset identifier and, then, determines a high-priority frame with the highest priority (Step S302). The selection unit 8 outputs the high-priority frame with the highest priority to the fixed-delay queue 3b. The fixed-delay queue 3b continues storing therein the high-priority frame with the highest priority until a fixed delay time has elapsed (NO at Step S303). When the fixed delay time has elapsed (YES at Step S303), the transmission-frame selection unit 5b executes control to transmit the high-priority frame with the highest priority among the conflicting high-priority frames from the output control unit 7a on the basis of the determination result in the selection unit 8 (Step S304). The transmission-frame selection unit 5b then executes control to discard the remaining conflicting high-priority frames (Step S305).

As described above, according to the present embodiment, upon receiving high-priority frames from a plurality of input ports at a timing at which output of these frames conflict with each other at a single port, the relay device 1b delays only a high-priority frame with the highest priority in accordance with the priority of the high-priority frames by a set fixed delay time and, then, transmits this frame. Due to this operation, the relay device 1b can prevent occurrence of delay jitter in a general-purpose network and can transfer the most important frame among high-priority frames having a special priority with a fixed delay.

Note that the relay device 1b according to the present embodiment is configured to include only a single low-priority frame buffer 4a for low-priority frames similar to the relay device 1a in the second embodiment. However, the relay device 1b is not limited to this configuration. The configuration can be such that the low-priority frame buffer 4a is configured by the low-priority frame buffer 4 and the retransmitting buffer 6 similar to the relay device 1 in the first embodiment.

Fourth Embodiment

According to the third embodiment, in the high-priority frame conflict control method, only a high-priority frame with the highest priority is delayed by a set fixed delay time and transmitted, while the remaining conflicting high-priority frames are discarded. In a fourth embodiment of the present invention, a method is described, in which remaining conflicting high-priority frames cannot be transmitted with a fixed delay but are still transmitted without being discarded. Configurations identical to those of the first to third embodiments are annotated with like reference signs and detailed descriptions thereof are omitted.

Figure 11:
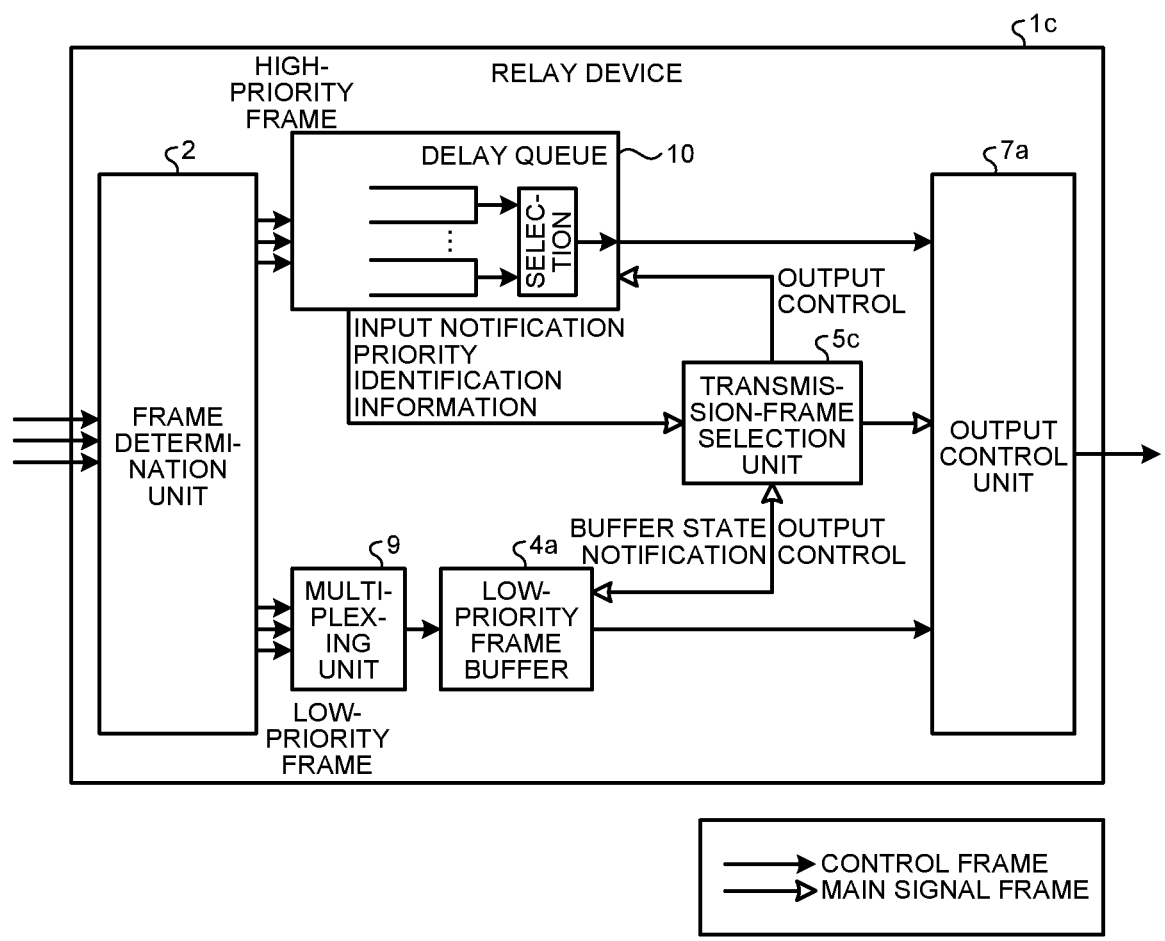
FIG. 11 is a diagram illustrating an example configuration of a relay device according to a fourth embodiment.

FIG. 11 is a diagram illustrating an example configuration of a relay device 1c according to the fourth embodiment. In comparison to the relay device 1b, the relay device 1c omits the selection unit 8 and replaces the fixed-delay queue 3b and the transmission-frame selection unit 5b with a delay queue 10 and a transmission-frame selection unit 5c, respectively. In the relay device 1c, the frame determination unit 2 is implemented to each input port; and the delay queue 10, the low-priority frame buffer 4a, the transmission-frame selection unit 5c, the output control unit 7a, and the multiplexing unit 9 are implemented for each output port.

The frame determination unit 2 determines a frame received through each input port into a high-priority frame or a low-priority frame for each output port on the basis of an identifier defined in the header or the payload of the received frame or on the basis of a preset identifier. Hereinafter, a high-priority frame is defined as a frame with a special priority and a low-priority frame is defined as a frame with a lower priority than the high-priority frame.

The delay queue 10 is a high-priority queue that includes queues capable of storing therein a plurality of high-priority frames received from a plurality of input ports and that determines the priority of the high-priority frames on the basis of an identifier defined in the header or the payload of the high-priority frames received from the input ports, or on the basis of a preset identifier. The delay queue 10 notifies the transmission-frame selection unit 5c of priority identification information indicating the priority of the received high-priority frames and also notifies that the high-priority frames have been input. Further, the delay queue 10 stores the high-priority frames, received from the frame determination unit 2 through the ports, from the beginning of the frame in one of the queues, which is empty. The delay queue 10 simultaneously stores a plurality of high-priority frames for each output port and delays the high-priority frames for a fixed time or a dynamically-designated time.

Similar to the third embodiment, as an identifier to determine the priority, other than the information stored in the frame, input-port information can be used by, for example, setting the priority to each input port in advance. However, the identifier is not limited thereto.

Upon receiving priority identification information of high-priority frames and their input notification from the delay queue 10, the transmission-frame selection unit 5c executes control to transmit a high-priority frame with the highest priority from the delay queue 10. The transmission-frame selection unit 5c determines the priority of the high-priority frames by using the priority notified from the delay queue 10 and dynamically-changing identifier information. The transmission-frame selection unit 5c performs a process of transmitting a high-priority frame HIGH and a high-priority frame LOW with their output timings conflicting with each other by executing control of the output of the high-priority frame HIGH after a lapse of fixed delay time; to delay the high-priority frame LOW for a fixed delay time or longer by the minimum IFG after the output of the high-priority frame HIGH; and then to output this high-priority frame LOW. That is, the transmission-frame selection unit 5c executes control, on the basis of the priority determination results of high-priority frames in the delay queue 10 and on the basis of the dynamically-changing identifier information; to transmit a frame with the highest priority among the conflicting high-priority frames with a fixed delay; to delay the remaining conflicting high-priority frames for a fixed delay time or longer; and then to transmit these frames in the order of the highest priority. The control in the transmission-frame selection unit 5c to permit an output request from the low-priority frame buffer 4a and to transmit a low-priority frame from the low-priority frame buffer 4a is similar to the process in the second embodiment.

Examples of the dynamically-changing identifier information to determine the priority include a timing at which a high-priority frame is input to the relay device 1c, such as an input order, an input time, and a frame retention time. However, the dynamically-changing identifier information is not limited thereto.

In the present embodiment, after receiving a notification that a high-priority frame has been input, when within the length of transfer time obtained by adding the minimum IFG to the frame length of this high-priority frame, the transmission-frame selection unit 5c receives a further notification that another high-priority frame has been input, then the transmission-frame selection unit 5c determines that a transfer conflict has occurred. Therefore, the delay queue 10 delays one of the high-priority frames, which may conflict with and may have a higher priority than the other high-priority frame, for a fixed delay time equal to or longer than data transfer time by the length of "the minimum IFG+the maximum frame length of the other high-priority frame that may have a lower priority".

On the basis of the control command from the transmission-frame selection unit 5c, the output control unit 7a selects a transfer frame to be transmitted to a downstream device.

As described above, in the relay device 1c, a high-priority frame HIGH, which is desired to be transferred with a top priority among conflicting high-priority frames, is delayed by a fixed delay time by the delay queue 10, and then output. In the relay device 1c, a high-priority frame LOW with the second highest priority is delayed for a fixed delay time or longer by the delay queue 10, and is output continuously after the output of the high-priority frame HIGH. Therefore, the relay device 1c can achieve fixed-delay transfer of a high-priority frame that is desired to have a top priority.

Figure 12:
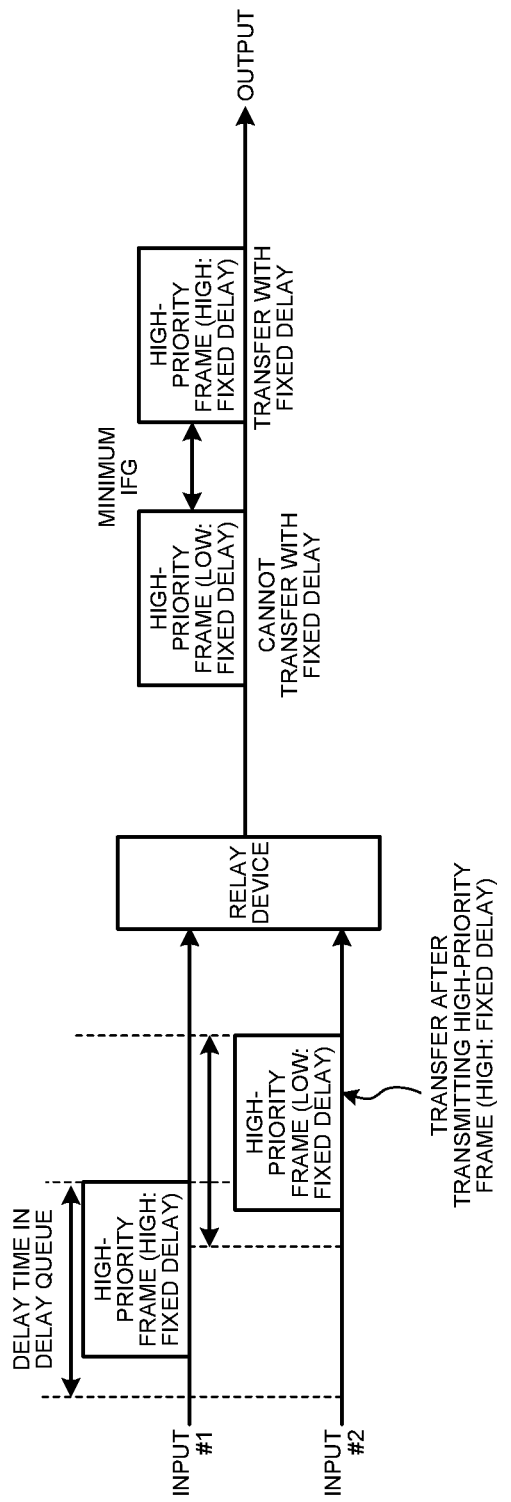
FIG. 12 is a diagram illustrating a transfer process when output timings of high-priority frames conflict with each other in the relay device according to the fourth embodiment.

FIG. 12 is a diagram illustrating a transfer process when output timings of high-priority frames conflict with each other in the relay device 1c according to the fourth embodiment. When, after start of receiving a high-priority frame LOW, the relay device 1c starts receiving a high-priority frame HIGH and when in consideration of the IFG output timings of these frames conflict with each other, the relay device 1c delays the high-priority frame LOW for a fixed delay time or longer and transfers only the high-priority frame HIGH with a fixed delay. The relay device 1c cannot transfer the high-priority frame LOW after a lapse of fixed delay time, but still transfers this high-priority frame LOW without discarding it.

Note that, although there are two high-priority frames to be input in FIG. 12, this is merely an example. Likewise, in a case with three or more high-priority frames, only a high-priority frame with the highest priority among conflicting high-priority frames is transferred with a fixed delay, and the remaining conflicting high-priority frames are delayed for a fixed delay time or longer and then transferred.

Figure 13:
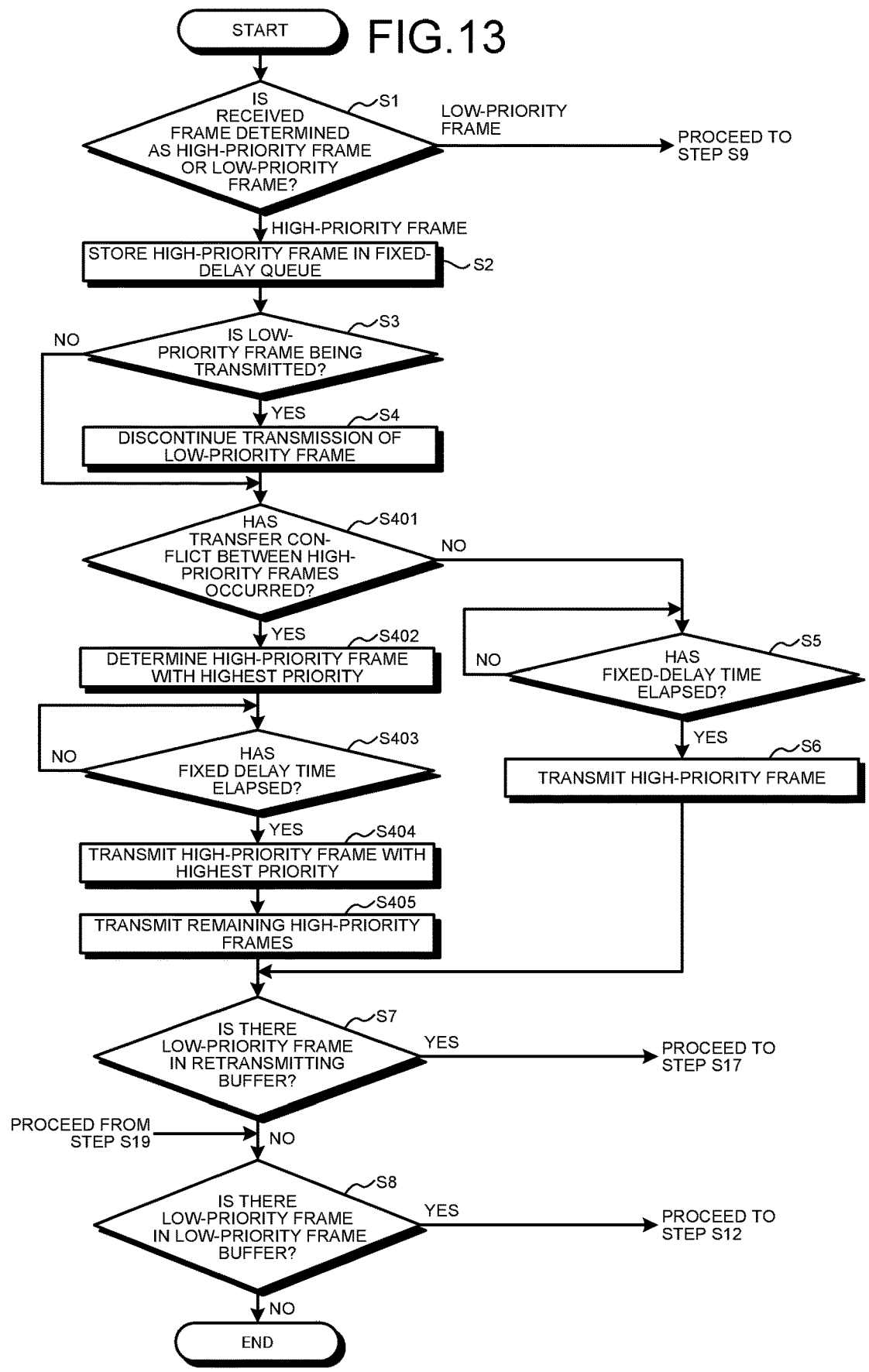
FIG. 13 is a flowchart illustrating a data transfer method in the relay device according to the fourth embodiment.

A data transfer method in the relay device 1c is described with reference to a flowchart. FIG. 13 is a flowchart illustrating the data transfer method in the relay device 1c according to the fourth embodiment. Similar to FIG. 10 in the third embodiment, only a part of the process, illustrated on the left side of the flowchart in FIG. 4 in the first embodiment, is described, which relates to high-priority frame processing. The processes at Steps S9 to S20, which relate to transmission of a low-priority frame, are identical to those in the first embodiment and therefore descriptions thereof are omitted. Further, the processes at Steps S1 to S8, which relate to high-priority frame processing, are identical to those in the first embodiment and therefore descriptions thereof are omitted. However, at Step S2, the storing location of a high-priority frame is the delay queue 10 that stores therein a plurality of high-priority frames simultaneously for each output port, and that delays the high-priority frames for a fixed time or a dynamically-designated time.

In the relay device 1c, when, after Step S4 or after NO at Step S3, a transfer conflict between a plurality of high-priority frames has occurred (YES at Step S401), the delay queue 10 determines the priority of each of the conflicting high-priority frames on the basis of an identifier defined in the received frame or a preset identifier, and then determines a high-priority frame with the highest priority (Step S402). The delay queue 10 continues storing therein the high-priority frame with the highest priority until a fixed delay time has elapsed (NO at Step S403). When a fixed delay time has elapsed (YES at Step S403), the transmission-frame selection unit 5c executes control to transmit the high-priority frame with the highest priority among the conflicting high-priority frames from the output control unit 7a on the basis of the priority determination results of the high-priority frames in the delay queue 10 and on the basis of dynamically-changing identifier information (Step S404). The transmission-frame selection unit 5c then executes control to delay the remaining conflicting high-priority frames for a fixed delay time or longer and to transmit these frames in the order of the highest priority (Step S405).

As described above, according to the present embodiment, upon receiving high-priority frames from a plurality of input ports at a timing at which output of these frames conflict with each other at a single port, the relay device 1c delays only a high-priority frame with the highest priority in accordance with the priority of the high-priority frames by a set fixed delay time, then transmits this frame; also delays the remaining conflicting high-priority frames by the fixed delay time or longer and then transmits these frames. Due to this operation, the relay device 1c can prevent occurrence of delay jitter in a general-purpose network and can transfer the most important frame among high-priority frames having a special priority with a fixed delay, while transferring a high-priority frame with a different priority with a low delay without discarding it.

The relay device 1c in the present embodiment is configured to include only a single low-priority frame buffer 4a for low-priority frames similar to the relay device 1a in the second embodiment. However, the relay device 1c is not limited to this configuration. The low-priority frame buffer 4a can be configured by the low-priority frame buffer 4 and the retransmitting buffer 6, similar to the relay device 1 in the first embodiment. The same applies to the following fifth embodiment.

Fifth Embodiment

In a fifth embodiment of the present invention, described is a case where the relay device 1c transfers a high-priority frame on the basis of the transfer type of whether the high-priority frame is transferred with a fixed delay or a low delay. The configuration of the relay device 1c is identical to that of the fourth embodiment.

The delay queue 10 includes queues capable of storing therein a plurality of high-priority frames received from a plurality of input ports. The delay queue 10 determines the priority of high-priority frames on the basis of an identifier defined in the header or the payload of the high-priority frames received from the input ports or on the basis of a preset identifier, and also determines the transfer type of whether the high-priority frame is transferred with a fixed delay or a low delay. The fixed-delay transfer is identical to the transfer method in the fourth embodiment. The low-delay transfer is a transfer method for transferring a high-priority frame as soon as possible. The delay queue 10 notifies the transmission-frame selection unit 5c of priority identification information indicating the priority of received high-priority frames and transfer-type information and also notifies that the high-priority frames have been input. Further, the delay queue 10 stores the high-priority frames, which are received from the frame determination unit 2 through the ports, from the beginning of the frame in one of the queues which is empty.

Similar to the fourth embodiment, as an identifier to determine the priority and the transfer type, other than the information stored in the frame, input-port information can be used by, for example, setting the priority to each input port in advance. For example, a frame received from a specific input port is defined as a high-priority frame, and frames received from the other input ports are defined as a low-priority frame. Further, a frame received from a specific input port is transferred with a fixed delay, and frames received from the other input ports are transferred with a low delay. The information for determining the priority and the transfer type is not limited thereto.

In the present embodiment, the transmission-frame selection unit 5c confirms that a low-priority frame has been transmitted by a frame length long enough for a device downstream of the relay device 1c to be capable of correctly discarding the frame, and thereafter discontinues transferring the low-priority frame before the point in time at which the minimum IFG is ensured to the point in time at which the transfer of a high-priority frame starts.

Upon receiving a notification from the delay queue 10 that high-priority frames have been input, the transmission-frame selection unit 5c executes control to transmit a high-priority frame with the highest priority from the delay queue 10 by fixed-delay transfer or low-delay transfer in accordance with the transfer type of the corresponding high-priority frame. The transmission-frame selection unit 5c determines the priority and the transfer type of the high-priority frames by using information on the priority and the transfer type that are notified from the delay queue 10 and by using dynamically-changing identifier information. When a high-priority frame HIGH is a low-delay transfer frame, the transmission-frame selection unit 5c outputs this frame HIGH with a low delay, which is delayed by the shortest possible time for transmission. When a high-priority frame HIGH is a fixed-delay transfer frame, the transmission-frame selection unit 5c outputs this frame HIGH after a lapse of fixed delay time. The transmission-frame selection unit 5c performs a process of transmitting a high-priority frame HIGH and a high-priority frame LOW with their output timings conflicting with each other by executing control to delay the high-priority frame LOW with a low delay or for a fixed delay time or longer by the minimum IFG after the output of the high-priority frame HIGH. That is, the transmission-frame selection unit 5c executes control, on the basis of the determination results of the priority and the transfer type of high-priority frames in the delay queue 10 and on the basis of dynamically-changing identifier information, to preferentially transmit a frame with the highest priority among the conflicting high-priority frames in accordance with the transfer type, and to transmit the remaining conflicting high-priority frames in accordance with the transfer type in the order of the highest priority. In a case where a high-priority frame HIGH is transferred with a fixed delay and a high-priority frame LOW is transferred with a low delay, the transmission-frame selection unit 5c may transmit the high-priority frame LOW before transmitting the high-priority frame HIGH.

Examples of the dynamically-changing identifier information to determine the priority and the transfer type include a timing at which a high-priority frame is input to the relay device 1c, such as an input order, an input time, and a frame retention time. However, the dynamically-changing identifier information is not limited thereto.

In the present embodiment, the transmission-frame selection unit 5c determines whether transmission timings conflict with each other on the basis of a timing to transmit a high-priority frame in accordance with the transfer type after receiving a notification that this high-priority frame has been input and on the basis of a timing to transmit another high-priority frame in accordance with the transfer type after receiving a further notification that this additional high-priority frame has been input. Therefore, the delay queue 10 delays one of the high-priority frames, which may conflict with and may have a higher priority than the other high-priority frame, for a fixed delay time equal to or longer than a data transfer time by the length of "the minimum IFG+the maximum frame length of the other high-priority frame that may have a lower priority".

As described above, in the relay device 1c, a high-priority frame HIGH, which is desired to be transferred with a top priority among conflicting high-priority frames, is transmitted from the delay queue 10 in accordance with the transfer type. In the relay device 1c, a high-priority frame LOW with the second highest priority is output from the delay queue 10 in accordance with the transfer type. Therefore, the relay device 1c can achieve fixed-delay transfer or low-delay transfer of a high-priority frame that is desired to have a top priority.

Figure 14:
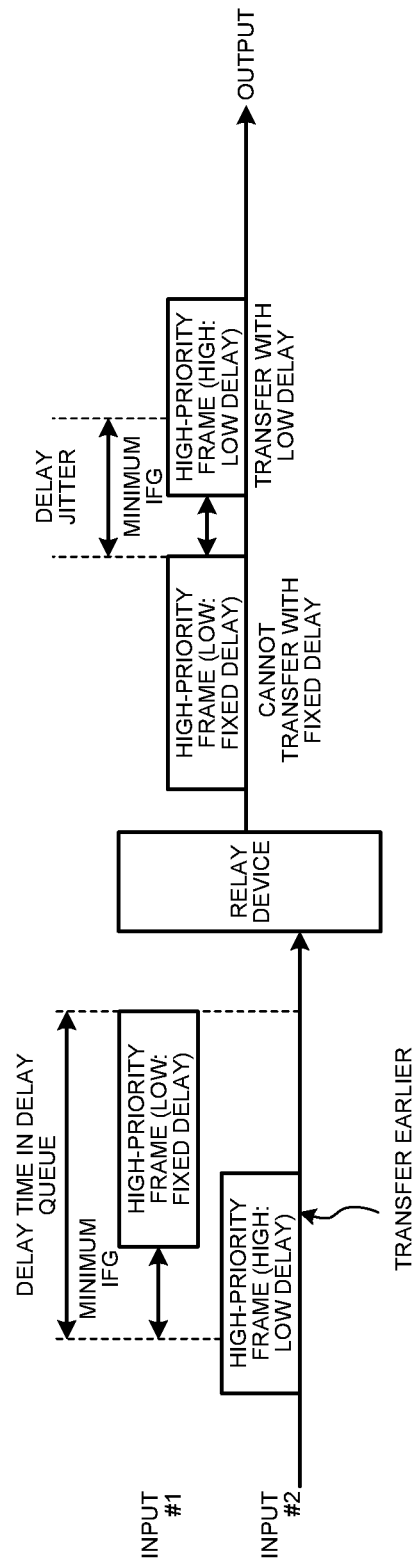
FIG. 14 is a diagram illustrating a transfer process of transferring a low-delay-transfer high-priority frame earlier when output timings of high-priority frames conflict with each other in a relay device according to a fifth embodiment.

FIG. 14 is a diagram illustrating a transfer process of transferring a low-delay-transfer high-priority frame earlier when output timings of high-priority frames conflict with each other in the relay device 1c according to the fifth embodiment. When, after start of receiving a fixed-delay high-priority frame LOW, the relay device 1c starts receiving a low-delay high-priority frame HIGH, the relay device 1c transfers the low-delay high-priority frame HIGH with a low delay and delays the fixed-delay high-priority frame LOW for a fixed delay time or longer to transfer this fixed-delay high-priority frame LOW after the low-delay high-priority frame HIGH. The relay device 1c cannot transfer the fixed-delay high-priority frame LOW after a lapse of fixed delay time. However, the relay device 1c still transfers this fixed-delay high-priority frame LOW without discarding it, while preventing occurrence of delay jitter.

Figure 15:
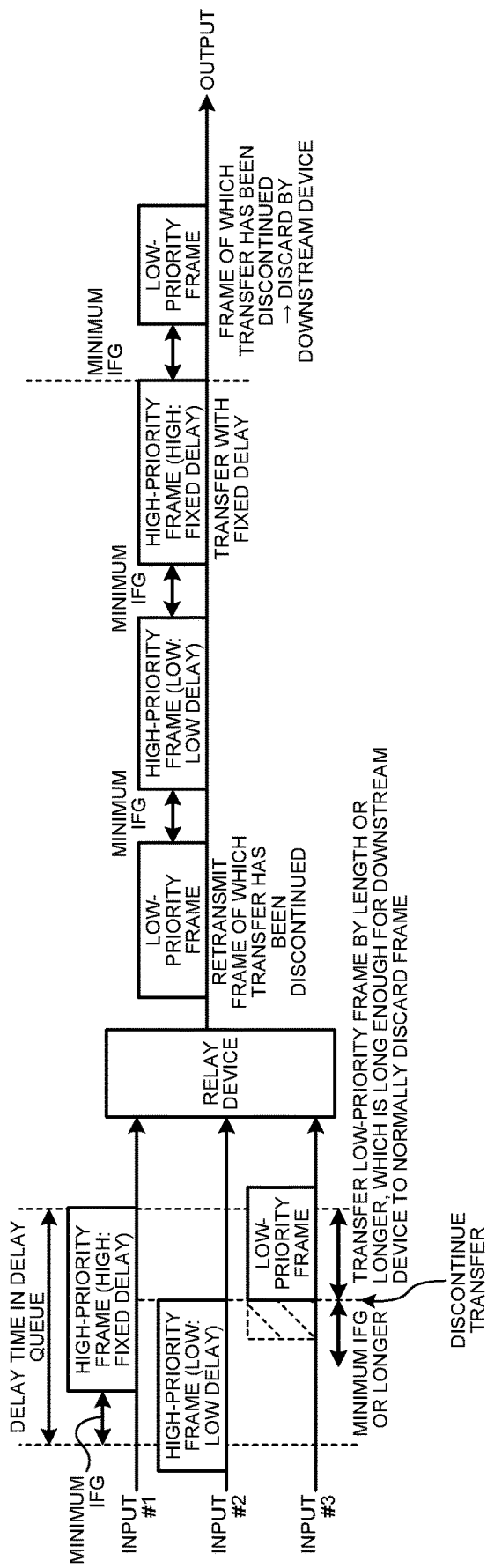
FIG. 15 is a diagram illustrating a transfer process including discontinuing low-priority frame transfer and retransmitting the low-priority frame, while transferring a fixed-delay-transfer high-priority frame earlier, when output timings of high-priority frames conflict with each other in the relay device according to the fifth embodiment.

FIG. 15 is a diagram illustrating a transfer process including discontinuing low-priority frame transfer and retransmitting the low-priority frame, while transferring a fixed-delay-transfer high-priority frame earlier, when output timings of the high-priority frames conflict with each other in the relay device 1c according to the fifth embodiment. When, during transmission of a low-priority frame, the relay device 1c starts receiving a fixed-delay high-priority frame HIGH and a low-delay high-priority frame LOW in the described order, the relay device 1c discontinues transmission of the low-priority frame, transfers the fixed-delay high-priority frame HIGH with a fixed delay, subsequently transfers the low-delay high-priority frame LOW, and lastly retransmits the low-priority frame.

While, in FIGS. 14 and 15, there are two high-priority frames to be input, this is merely an example. Likewise, in a case with three or more high-priority frames, the relay device 1c also performs a process of most preferentially transferring a high-priority frame determined as the highest-priority frame among conflicting high-priority frames in the order of the priority.

Figure 16:
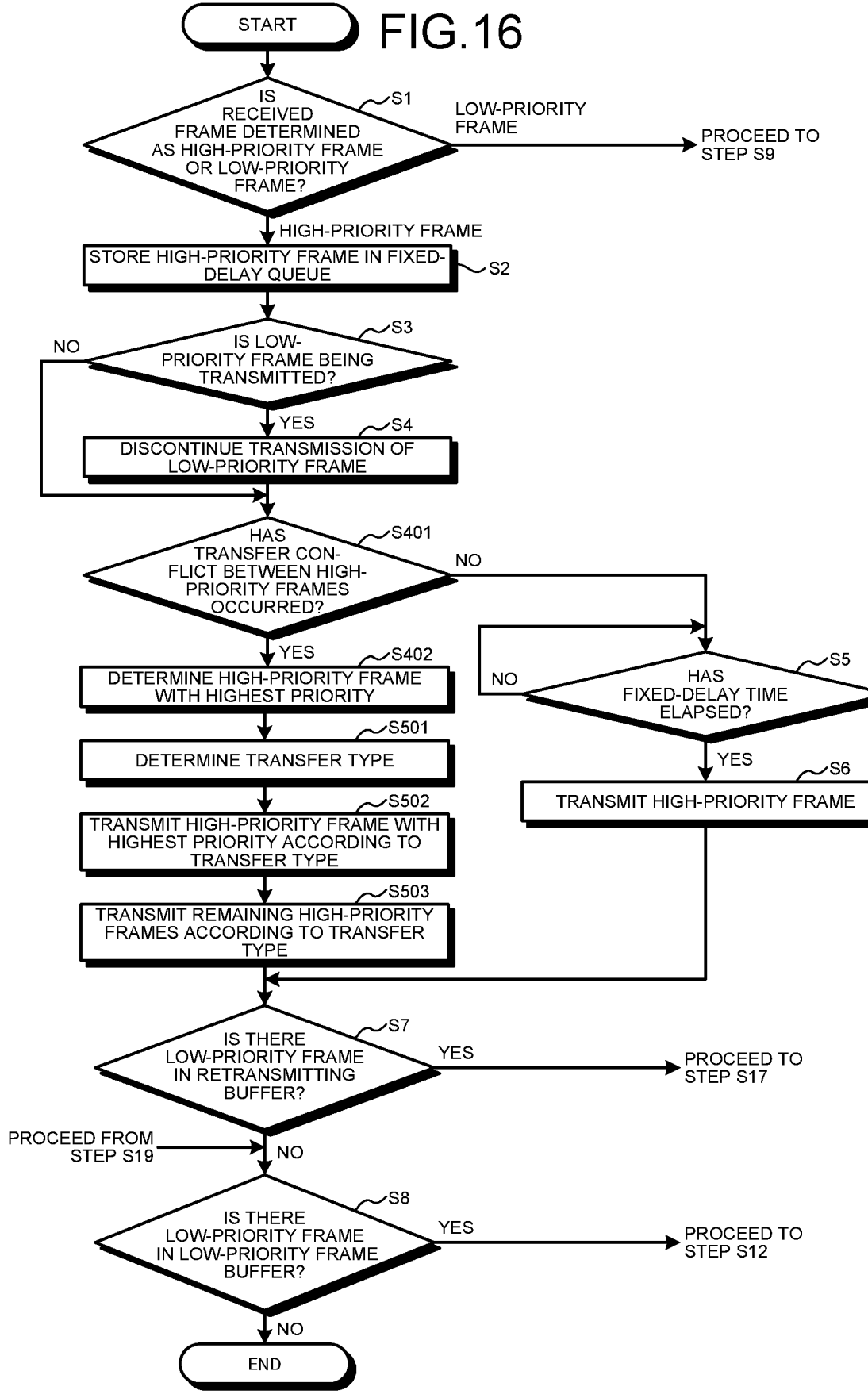
FIG. 16 is a flowchart illustrating a data transfer method in the relay device according to the fifth embodiment.

A data transfer method in the relay device 1c is described with reference to a flowchart. FIG. 16 is a flowchart illustrating the data transfer method in the relay device 1c according to the fifth embodiment. Similar to FIG. 13 in the fourth embodiment, only a part of the process, illustrated on the left side of the flowchart in FIG. 4 in the first embodiment, is described, which relates to the high-priority frame processing. The processes at Steps S9 to S20, which relate to transmission of a low-priority frame, are identical to those in the first embodiment, and therefore descriptions thereof are omitted. Further, the processes at Steps S1 to S8, which relate to high-priority frame processing, are identical to those in the first embodiment, and therefore descriptions thereof are omitted. Furthermore, Steps S401 and S402 are identical to those in the fourth embodiment, and therefore descriptions thereof are omitted.

After Step S402, the delay queue 10 further determines the transfer type of each of the conflicting high-priority frames on the basis of an identifier defined in the received frame or a preset identifier (Step S501). The transmission-frame selection unit 5c executes control to preferentially transmit a high-priority frame with the highest priority among the conflicting high-priority frames in accordance with the transfer type from the output control unit 7a on the basis of the determination results of the priority and the transfer type of the high-priority frames in the delay queue 10 and on the basis of dynamically-changing identifier information (Step S502). The transmission-frame selection unit 5c then executes control to transfer the remaining conflicting high-priority frames in accordance with the transfer type in the order of high priority (Step S503).

As described above, according to the present embodiment, upon receiving high-priority frames from a plurality of input ports at a timing at which output of these frames conflict with each other at a single port, the relay device 1c delays a high-priority frame with the highest priority in accordance with the priority of the high-priority frames by a set time or a dynamically-variable time, and then transmits this frame. Due to this operation, the relay device 1c can transfer a high-priority frame with a low delay without discarding it, while preventing occurrence of delay jitter in a frame that requires a fixed delay in a general-purpose network.

In the third to fifth embodiments, when high-priority frames conflict with each other such as when frames input from a plurality of ports are output to the same port, the relay device identifies the priority among the high-priority frames on the basis of an identifier defined in the header or the payload of the received frame or on the basis of an identifier defined by a predetermined priority, which is in the aforementioned example, an identifier that identifies each input port when the priority is set to each input port; and then transfers a higher-priority frame with a fixed delay or a low delay. Therefore, the relay device includes one or more delay queues. By controlling the delay amount for respective frames, or by discarding one of them when they conflict with each other, the relay device controls the output of the conflicting high-priority frames, while controlling the output of a low-priority frame. Due to this control, even when an output conflict between high-priority frames has occurred, the relay device can transfer the highest-priority frame with a fixed delay, or executes transmission-order control on target high-priority frames, and therefore can transfer the important frame with an optimal low delay or an optimal fixed delay.

Figure 17:
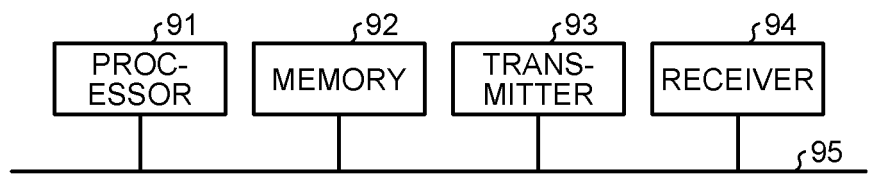
FIG. 17 is a diagram illustrating a hardware configuration to implement a relay device.

Next, described is a hardware configuration to implement each constituent element of the relay device illustrated in FIGS. 1, 5, 8, and 11. In the relay device, the frame determination unit 2 is a frame determination circuit. Further, the fixed-delay queue 3 or 3b, the low-priority frame buffer 4 or 4a, the retransmitting buffer 6, and the delay queue 10 constitute a memory. The transmission-frame selection unit 5, 5a, 5b, or 5c is a transmission-frame selection circuit. The output control unit 7 or 7a is an output control circuit. The selection unit 8 is a selection circuit. The multiplexing unit 9 is a multiplexing circuit. It suffices that a part of the configuration of the relay device illustrated in FIGS. 1, 5, 8, and 11 is constituted by software. FIG. 17 is a diagram illustrating a hardware configuration to implement the relay device 1, 1a, 1b, or 1c. A part of the configuration of the relay device 1, 1a, 1b, or 1c is implemented by a processor 91 by executing a program for each constituent element stored in a memory 92. The processor 91 and the memory 92 along with a transmitter 93 and a receiver 94 implement the relay device 1, 1a, 1b, or 1c. The processor 91, the memory 92, the transmitter 93, and the receiver 94 are connected through a system bus 95. It can be conjured that a plurality of processors 91 and a plurality of memories 92 cooperate with each other to realize the function of each constituent element illustrated in FIGS. 1, 5, 8, and 11.

The configurations according to the above embodiments are only an example of the contents of the present invention, and can be combined with other well-known techniques, or a part thereof can be omitted or modified without departing from the scope of the invention.

As described above, the relay device and the data transfer method according to the present invention are useful in wireless communication, and are particularly applicable to an FA network.

REFERENCE SIGNS LIST 1, 1a, 1b, 1c relay device, 2 frame determination unit, 3, 3b fixed-delay queue, 4, 4a low-priority frame buffer, 5, 5a, 5b, 5c transmission-frame selection unit, 6 retransmitting buffer, 7, 7a output control unit, 8 selection unit, 9 multiplexing unit, 10 delay queue.

The invention claimed is:

1. A relay device comprising:
   a determination circuit that determines whether a received frame is a high-priority frame or a low-priority frame with a lower priority than the high-priority frame for an output port, of a plurality of output ports of the relay device, on a basis of an identifier defined in the received frame;
   a high-priority queue that receives the high-priority frame from the determination circuit, delays the high-priority frame for a preset time equal to or longer than a sum of a specified transmission gap and a frame length long enough for a downstream device to be capable of at least correctly discarding a low-priority frame for which transmission has been discontinued, and transmits the high-priority frame after the preset time expires;
   a low-priority frame memory that receives the low-priority frame from the determination circuit, and is configured to store and transmit the low-priority frame;
   a transmission-frame selection circuit which is, when the high-priority frame is received and a delay process of the preset time is started, configured to:
   based on the low-priority frame being received or being transmitted, determine whether an entirety of the low-priority frame can be transmitted within the preset time, when it is determined that a transmission of the entirety of the low-priority frame can be completed within the preset time, control to transmit the low-priority frame from the low-priority frame memory until the entirety of the low-priority frame is transmitted, and after the preset time expires, control to start a transmission of the high-priority frame, and when it is determined that the transmission of the entirety of the low-priority frame cannot be completed within the preset time, control to not start the transmission of the low-priority frame or to discontinue the transmission of the low-priority frame while the storing the low-priority frame in the low-priority frame memory is continued, after the preset time expires, control to start the transmission of the high-priority frame, and, after completion of the transmission of the high-priority frame, control to retransmit, from a beginning of the frame, the low-priority frame for which the transmission has been discontinued and which is stored in the low-priority frame memory; and
   an output control circuit that selects a frame to be transmitted to the downstream device in accordance with the control performed by the transmission-frame selection circuit.

2. The relay device according to claim 1, wherein the low-priority frame memory includes:
   a low-priority frame buffer that stores the low-priority frame, and
   a retransmitting buffer that stores the low-priority frame that is output from the low-priority frame buffer.

3. The relay device according to claim 2, wherein after the completion of the transmission of the high-priority frame, the transmission-frame selection circuit executes the control to retransmit, from the beginning of the frame, the low-priority frame for which the transmission has been discontinued and that is stored in the retransmitting buffer.

4. The relay device according to claim 3, wherein
   after completion of the transmission of the low-priority frame stored in the retransmitting buffer, the transmission-frame selection circuit is further configured to control the retransmitting buffer to release the low-priority frame stored therein.

5. The relay device according to claim 1, wherein the low-priority frame memory is a low-priority frame buffer configured to retransmit the low-priority frame while holding data of the low-priority frame stored therein until the transmission of the low-priority frame is completed.

6. The relay device according to claim 5, wherein
   after the completion of the transmission of the high-priority frame, the transmission-frame selection circuit executes the control to retransmit the low-priority frame for which the transmission has been discontinued and that is stored in the low-priority frame buffer.

7. The relay device according to claim 6, wherein
   after completion of the transmission of the low-priority frame stored in the low-priority frame buffer, the transmission-frame selection circuit is further configured to control the low-priority frame buffer to release the low-priority frame that is stored therein.

8. The relay device according to claim 1, wherein the high-priority frame is one of a plurality of high-priority frames,
   the relay device further comprises a selection circuit that, when a transfer conflict between the plurality of high-priority frames occurs, determines a priority of each of conflicting high-priority frames among the plurality of high-priority frames on a basis of the identifier defined in the received frame or a preset identifier,
   wherein the transmission-frame selection circuit executes the control, on a basis of a determination result by the selection circuit, to transmit a highest-priority frame among the conflicting high-priority frames with a fixed delay, and to discard remaining conflicting high-priority frames.

9. The relay device according to claim 1, wherein the high-priority frame is one of a plurality of high-priority frames, and
the high-priority queue stores the plurality of high-priority frames for the output port and delays the plurality of high-priority frames for a fixed time or a dynamically-designated time.

10. The relay device according to claim 9, wherein
when a transfer conflict between the plurality of high-priority frames occurs, the high-priority queue determines a priority of each of conflicting high-priority frames among the plurality of high-priority frames on a basis of the identifier defined in the received frame or a preset identifier, and
the transmission-frame selection circuit executes the control, on a basis of priority determination results of the plurality of high-priority frames determined by the high-priority queue and on a basis of dynamically-changing identifier information, to transmit a highest-priority frame among the conflicting high-priority frames with a fixed delay, to delay remaining conflicting high-priority frames for a fixed delay time or longer, and to transmit the remaining conflicting high-priority frames in an order from a higher priority to a lower priority.

11. The relay device according to claim 9, wherein
when a transfer conflict between the plurality of high-priority frames occurs, the high-priority queue determines a priority and transfer type of each of conflicting high-priority frames among the plurality of high-priority frames on a basis of the identifier defined in the received frame or a preset identifier, and
the transmission-frame selection circuit executes the control, on a basis of determination results of the priority and a transfer type of the plurality of high-priority frames from the high-priority queue and on a basis of dynamically-changing identifier information, to preferentially transmit a highest-priority frame among the conflicting high-priority frames in accordance with a transfer type, and to transmit remaining conflicting high-priority frames in accordance with a transfer type in an order from a higher priority to a lower priority.

12. A data transfer method for a relay device, the data transfer method comprising:
a determination step of determining whether a received frame is a high-priority frame or a low-priority frame with a lower priority than the high-priority frame for an output port, of a plurality of output ports of the relay device, on a basis of an identifier defined in the received frame;
a high-priority frame storing step of receiving and storing the high-priority frame in a high-priority queue that delays the high-priority frame for a preset time equal to or longer than a sum of a specified transmission gap and a frame length long enough for a downstream device to be capable of at least correctly discarding a low-priority frame for which transmission has been discontinued, and transmitting the high-priority frame after the preset time is expired;
a low-priority frame storing step of storing the low-priority frame in a low-priority frame memory and transmitting the low-priority frame;
a transmission-frame selecting step of, when the high-priority frame is received and a delay process of the preset time is started, configured to:
based on the low-priority frame being received or being transmitted, determining whether an entirety of the low-priority frame can be transmitted within the preset time,
when it is determined that a transmission of the entirety of the low-priority frame can be completed within the preset time, controlling to transmit the low-priority frame from the low-priority frame memory until the entirety of the low-priority frame is transmitted, and after the preset time expires, controlling to start a transmission of the high-priority frame, and
when it is determined that the transmission of the entirety of the low-priority frame cannot be completed within the preset time, controlling to not start the transmission of the low-priority frame or to discontinue the transmission of the low-priority frame while the storing the low-priority frame in the low-priority frame memory is continued, after the preset time expires, controlling to start the transmission of the high-priority frame, and, after completion of the transmission of the high-priority frame, controlling to retransmit, from a beginning of the frame, the low-priority frame for which the transmission has been discontinued and which is stored in the low-priority frame memory; and
an output controlling step of selecting a frame to be transmitted to the downstream device in accordance with the control executed at the transmission-frame selecting step.

13. The data transfer method according to claim 12, wherein the low-priority frame memory comprises a low-priority frame buffer and a retransmitting buffer,
at the low-priority frame storing step, the low-priority frame is stored in the low-priority frame buffer, and
the data transfer method further comprises:
a retransmitting-buffer storing step of storing the low-priority frame output from the low-priority frame buffer, in the retransmitting buffer, and
at the transmission-frame selecting step, based on the low-priority frame being transmitted from the low-priority frame buffer when the high-priority frame is to be transmitted, the control is executed to discontinue the transmission of the low-priority frame while continuously storing the low-priority frame in the retransmitting buffer.

14. The data transfer method according to claim 13, wherein
at the transmission-frame selecting step, after the completion of the transmission of the high-priority frame, the control is executed to retransmit the low-priority frame for which the transmission has been discontinued and which is stored in the retransmitting buffer, from the beginning of the frame.

15. The data transfer method according to claim 14, wherein at the transmission-frame selecting step, after completion of the transmission of the low-priority frame stored in the retransmitting buffer, controlling the retransmitting buffer to release the low-priority frame stored therein.

16. The data transfer method according to claim 12, wherein
at the low-priority frame storing step, the low-priority frame is stored in a low-priority frame buffer of the low-priority frame memory, and is in a state capable of being retransmitted, data of the low-priority frame being held stored therein until the transmission of the low-priority frame is completed.

17. The data transfer method according to claim 16, wherein
at the transmission-frame selecting step, the control is executed to retransmit the low-priority frame for which the transmission has been discontinued and which is stored in the low-priority frame buffer, from the beginning of the frame.

18. The data transfer method according to claim 17, wherein
at the transmission-frame selecting step, after completion of the transmission of the low-priority frame stored in the low-priority frame buffer, controlling the low-priority frame buffer to release the low-priority frame stored therein.

19. The data transfer method according to claim 12, wherein the high-priority frame is one of a plurality of high-priority frames,
the data transfer method further comprises a determining step of, when a transfer conflict between the plurality of high-priority frames occurs, determining a priority of each of conflicting high-priority frames among the plurality of high-priority frames on a basis of the identifier defined in the received frame or a preset identifier,
wherein at the transmission-frame selecting step, the control is executed, on a basis of determination results at the determining step, to transmit a highest-priority frame among the conflicting high-priority frames with a fixed delay, and to discard remaining conflicting high-priority frames.

20. The data transfer method according to claim 12, wherein the high-priority frame is one of a plurality of high-priority frames, and
at the high-priority frame storing step, the plurality of high-priority frames are stored for the output port, and are delayed for a fixed time or a dynamically-designated time.

21. The data transfer method according to claim 20, further comprising:
a determining step of, when a transfer conflict between the plurality of high-priority frames occurs, determining a priority of each of conflicting high-priority frames among the plurality of high-priority frames on a basis of the identifier defined in the received frame or a preset identifier,
wherein at the transmission-frame selecting step, the control is executed, on a basis of priority determination results of the plurality of high-priority frames in the high-priority queue and on a basis of dynamically-changing identifier information, to transmit a highest-priority frame among the conflicting high-priority frames with a fixed delay, to delay remaining conflicting high-priority frames for a fixed delay time or longer, and to transmit the remaining conflicting high-priority frames in an order from a higher priority to a lower priority.

22. The data transfer method according to claim 20, further comprising:
a determining step of, when a transfer conflict between the plurality of high-priority frames occurs, determining a priority and a transfer type of each of conflicting high-priority frames among the plurality of high-priority frames on a basis of the identifier defined in the received frame or a preset identifier,
wherein at the transmission-frame selecting step, the control is executed, on a basis of determination results of the priority and a transfer type of the plurality of high-priority frames in the high-priority queue and on a basis of dynamically-changing identifier information, to preferentially transmit a highest-priority frame among the conflicting high-priority frames in accordance with a transfer type, and to transmit remaining conflicting high-priority frames in accordance with a transfer type in an order from a higher priority to a lower priority.

23. The relay device according to claim 1, wherein the high-priority queue further delays the high-priority frame further for a time equal to or longer than a sum of the specified transmission gap and a frame length long enough for the downstream device to be capable of correctly receiving and transferring the frame, and transmits the high-priority frame after a delay.

24. The data transfer method according to claim 12, wherein the high-priority frame storing step includes further delaying the high-priority frame for a time equal to or longer than a sum of the specified transmission gap and a frame length long enough for the downstream device to be capable of correctly receiving and transferring the frame, and transmitting the high-priority frame after a delay.

* * * * *